US012085959B2

(12) United States Patent
Zhang et al.

(10) Patent No.: US 12,085,959 B2
(45) Date of Patent: Sep. 10, 2024

(54) UNMANNED AERIAL VEHICLE CLUSTER SYSTEM, METHOD, APPARATUS, AND SYSTEM OF LAUNCHING, AND READABLE MEDIUM

(71) Applicant: BEIJING JINGDONG QIANSHI TECHNOLOGY CO., LTD., Beijing (CN)

(72) Inventors: Bo Zhang, Beijing (CN); Hang Ba, Beijing (CN); Chengxian Sha, Beijing (CN); Longfei Zheng, Beijing (CN); Yunan Chen, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 367 days.

(21) Appl. No.: 17/440,553

(22) PCT Filed: Jan. 14, 2020

(86) PCT No.: PCT/CN2020/071995
§ 371 (c)(1),
(2) Date: Sep. 17, 2021

(87) PCT Pub. No.: WO2020/186919
PCT Pub. Date: Sep. 24, 2020

(65) Prior Publication Data
US 2022/0147062 A1 May 12, 2022

(30) Foreign Application Priority Data
Mar. 18, 2019 (CN) .......................... 201910207380.9

(51) Int. Cl.
G05D 1/00 (2024.01)
B64C 39/02 (2023.01)
B64U 80/70 (2023.01)

(52) U.S. Cl.
CPC ........... *G05D 1/104* (2013.01); *B64C 39/024* (2013.01); *G05D 1/102* (2013.01); *B64U 80/70* (2023.01); *B64U 2201/102* (2023.01)

(58) Field of Classification Search
CPC ...... G05D 1/104; G05D 1/102; G05D 1/0661; G05D 1/101; B64C 39/024; B64U 80/70; B64U 2201/102; B64U 70/00
See application file for complete search history.

(56) References Cited

U.S. PATENT DOCUMENTS 10,310,518 B2 * 6/2019 MacCready ........... G05D 1/104
2014/0374535 A1 * 12/2014 Wong ...................... G09G 5/02
244/17.23

(Continued)

FOREIGN PATENT DOCUMENTS

| CN | 105278543 | 1/2016 |
| CN | 106125758 | 11/2016 |

(Continued)

OTHER PUBLICATIONS

International Search Report issued in International Application No. PCT/CN2020/071995, Apr. 20, 2020, 6 pages w/translation.

(Continued)

*Primary Examiner* — Assres H Woldemaryam
(74) *Attorney, Agent, or Firm* — HSML P.C.

(57) ABSTRACT

An unmanned aerial vehicle cluster system, a method, apparatus, and system of launching, and a readable medium. The unmanned aerial vehicle cluster includes a plurality of unmanned aerial vehicles located in a launch area. The method of launching the unmanned aerial vehicle cluster includes: acquiring (S210) launch positions for the plurality of unmanned aerial vehicles in the launch area; acquiring (S220) an assembly area which corresponds to the launch area and includes a plurality of target positions; determining (S230) a target position for each unmanned aerial vehicle of (Continued)

the plurality of unmanned aerial vehicles according to the launch positions for the plurality of unmanned aerial vehicles and the plurality of target positions; and launching (S240) the plurality of unmanned aerial vehicles according to the launch position for each unmanned aerial vehicle of the plurality of unmanned aerial vehicles and the target position for each unmanned aerial vehicle.

11 Claims, 9 Drawing Sheets

(56) References Cited

U.S. PATENT DOCUMENTS

| | | | | |
|---|---|---|---|---|
| 2015/0301529 | A1* | 10/2015 | Pillai | G08G 5/0026 |
| | | | | 701/2 |
| 2018/0136647 | A1* | 5/2018 | Gurdan | B64D 47/02 |
| 2019/0107846 | A1* | 4/2019 | Roy | G08G 5/04 |

FOREIGN PATENT DOCUMENTS

| | | |
|---|---|---|
| CN | 106814748 | 6/2017 |
| CN | 107728642 | 2/2018 |
| CN | 107918403 | 4/2018 |
| CN | 108334108 | 7/2018 |
| CN | 108447309 | 8/2018 |
| CN | 108508911 | 9/2018 |
| CN | 108733074 | 11/2018 |
| CN | 108762299 | 11/2018 |
| CN | 108871330 | 11/2018 |
| EP | 3 290 952 | 3/2018 |

OTHER PUBLICATIONS

Office Action issued in Chinese Patent Application No. 201910207380.9, Jun. 28, 2021, 16 pages w/translation.
Extended European Search Report, issued in the corresponding European patent application number Oct. 27, 2022, 12 pages.
Dousse et al., "Extension of a ground control interface for swarms of Small Drones", Artif Life Robotics, 2016, 9 pages.

* cited by examiner

UNMANNED AERIAL VEHICLE CLUSTER SYSTEM, METHOD, APPARATUS, AND SYSTEM OF LAUNCHING, AND READABLE MEDIUM

CROSS REFERENCE TO RELATED APPLICATION(S)

This application is a Section 371 National Stage Application of International Application No. PCT/CN2020/071995, filed on Jan. 14, 2020, entitled "UNMANNED AERIAL VEHICLE CLUSTER SYSTEM, METHOD, APPARATUS, AND SYSTEM OF LAUNCHING, AND READABLE MEDIUM", which claims priority to Chinese Patent Application No. 201910207380.9, filed on Mar. 18, 2019, which is incorporated herein by reference in its entirety.

TECHNICAL FIELD

The present disclosure relates to a field of electronic technology, and in particular to an unmanned aerial vehicle cluster system, a method, apparatus, and system of launching, and a readable medium.

BACKGROUND

At present, the use of a single unmanned aerial vehicle (such as aerial photography, patrol inspection, logistics, etc.) has been relatively mature. Taking into account the advantages of multi-rotor unmanned aerial vehicle such as accurate positioning, flexible position tracking and capability of hovering, it is undoubtedly an important trend in current unmanned aerial vehicle development to use multiple unmanned aerial vehicles to form a formation to perform tasks.
In a process of realizing a concept of the present disclosure, the inventor found that there are at least following problems in a related art. When using unmanned aerial vehicle formation to perform tasks, it is generally necessary to make unmanned aerial vehicles launch from a specified position and assemble to form a specified formation before performing tasks. Due to cost control and technical limitations, an unmanned aerial vehicle formation flight is generally realized in a preset script path. Considering complex launch environment and interferences, a primary problem to be solved in launch of unmanned aerial vehicles is to avoid collisions as much as possible.

SUMMARY

An aspect of the present disclosure provides a method of launching an unmanned aerial vehicle cluster including a plurality of unmanned aerial vehicles located in a launch area. The method includes: acquiring launch positions for the plurality of unmanned aerial vehicles in the launch area; acquiring an assembly area corresponding to the launch area, wherein the assembly area includes a plurality of target positions; determining a target position for each unmanned aerial vehicle of the plurality of unmanned aerial vehicles according to the launch positions for the plurality of unmanned aerial vehicles and the plurality of target positions; and launching the plurality of unmanned aerial vehicles according to the launch position for each unmanned aerial vehicle of the plurality of unmanned aerial vehicles and the target position for the each unmanned aerial vehicle.

According the embodiments of the present disclosure, the launching the plurality of unmanned aerial vehicles according to the launch position for each unmanned aerial vehicle of the plurality of unmanned aerial vehicles and the target position for the each unmanned aerial vehicle includes: determining a flight path of the each unmanned aerial vehicle according to the launch position for the each unmanned aerial vehicle and the target position for the each unmanned aerial vehicle; determining a first distance between any two unmanned aerial vehicles of the plurality of unmanned aerial vehicles according to the flight paths of the any two unmanned aerial vehicles; determining a launch time of the each unmanned aerial vehicle according to the first distance between the any two unmanned aerial vehicles; and launching the each unmanned aerial vehicle according to the launch position for the each unmanned aerial vehicle and the flight path of the each unmanned aerial vehicle, wherein the first distance between the any two unmanned aerial vehicles is a shortest distance between the flight paths of the any two unmanned aerial vehicles.

According the embodiments of the present disclosure, the determining the launch time of the each unmanned aerial vehicle according to the first distance between the any two unmanned aerial vehicles includes: dividing the plurality of unmanned aerial vehicles into N flight groups according to the first distance between the any two unmanned aerial vehicles, where N is an integer greater than 1; and determining the launch time of each flight group of the N flight groups, wherein each flight group includes at least one unmanned aerial vehicle, and in a case that the any flight group of the N flight groups includes more than one unmanned aerial vehicles, the first distance between any two unmanned aerial vehicles of the more than one unmanned aerial vehicles is not less than a preset distance; different flight groups have different launch times, and the at least one unmanned aerial vehicle in each flight group has the same launch time.

According the embodiments of the present disclosure, the dividing the plurality of unmanned aerial vehicles into N flight groups according to the first distance between the any two unmanned aerial vehicles includes cyclically performing operations of: determining a number of unmanned aerial vehicles in an i-th flight group; determining whether the first distance between any two unmanned aerial vehicles in the i-th flight group is less than the preset distance or not, in response to determining that the number of unmanned aerial vehicles in the i-th flight group is greater than 1; allocating one of two unmanned aerial vehicles in the i-th flight group into an i+1-th flight group in response to determining that the first distance between the two unmanned aerial vehicles is less than the preset distance; and setting i to i+1 in response to determining that the first distance between every two unmanned aerial vehicles in the i-th flight group is not less than the preset distance, wherein the plurality of unmanned aerial vehicles belong to a first flight group before cyclically performing the operations, $1 \leq i \leq N$.

According the embodiments of the present disclosure, the determining a target position for each unmanned aerial vehicle of the plurality of unmanned aerial vehicles according to the launch positions for the plurality of unmanned aerial vehicles and the plurality of target positions includes: establishing a bipartite graph according to the launch positions for the plurality of unmanned aerial vehicles and the plurality of target positions; determining flight distances of the each unmanned aerial vehicle with respect to the plurality of target positions according to the launch positions for the plurality of unmanned aerial vehicles and the plurality of target positions; performing a maximum weight matching calculation on the bipartite graph according to the flight distances of the each unmanned aerial vehicle with respect to the plurality of target positions, so as to obtain a calculation result; and determining the target position for the each unmanned aerial vehicle according to the calculation result, wherein the calculation result is to minimize a sum of the flight distance of each unmanned aerial vehicle of the plurality of unmanned aerial vehicles with respect to the determined target position.

According the embodiments of the present disclosure, the acquiring launch positions for the plurality of unmanned aerial vehicles in the launch area includes: acquiring positioning information of the plurality of unmanned aerial vehicles in the launch area; determining a coordinate origin in the launch area; and converting the positioning information of the plurality of unmanned aerial vehicles in the launch area into relative position information with respect to the coordinate origin according to a conversion rule, wherein the relative position information indicates the launch positions for the plurality of unmanned aerial vehicles in the launch area.

Another aspect of the present disclosure provides an apparatus of launching an unmanned aerial vehicle cluster including a plurality of unmanned aerial vehicles located in a launch area. The apparatus includes: a launch position acquisition module configured to acquire launch positions for the plurality of unmanned aerial vehicles in the launch area; an assembly area acquisition module configured to acquire an assembly area corresponding to the launch area, wherein the assembly area includes a plurality of target positions; a target position determination module configured to determine a target position for each unmanned aerial vehicle of the plurality of unmanned aerial vehicles according to the launch positions for the plurality of unmanned aerial vehicles and the plurality of target positions; and a launch control module configured to launch the plurality of unmanned aerial vehicles according to the launch position for each unmanned aerial vehicle of the plurality of unmanned aerial vehicles and the target position for the each unmanned aerial vehicle.

According the embodiments of the present disclosure, the launch control module includes: a flight path determination sub-module configured to determine a flight path of the each unmanned aerial vehicle according to the launch position for the each unmanned aerial vehicle and the target position for the each unmanned aerial vehicle; a first distance determination sub-module configured to determine a first distance of any two unmanned aerial vehicles of the plurality of unmanned aerial vehicles according to the flight paths of the any two unmanned aerial vehicles; a launch time determination sub-module configured to determine a launch time of the each unmanned aerial vehicle according to the first distance between the any two unmanned aerial vehicles; and a launch control sub-module configured to launch the each unmanned aerial vehicle according to the launch time of the each unmanned aerial vehicle and the flight path of the each unmanned aerial vehicle, wherein the first distance between the any two unmanned aerial vehicles is a shortest distance between the flight paths of the any two unmanned aerial vehicles.

According the embodiments of the present disclosure, the launch time determination sub-module includes: a division unit configured to divide the plurality of unmanned aerial vehicles into N flight groups according to the first distance between the any two unmanned aerial vehicles, where N is an integer greater than 1; and a determination unit configured to determine a launch time of each flight group of the N flight groups, wherein each flight group includes at least one unmanned aerial vehicle, and in a case that the any flight group of the N flight groups includes more than one unmanned aerial vehicles, the first distance between any two unmanned aerial vehicles of the more than one unmanned aerial vehicles is not less than a preset distance; different flight groups have different launch times, and the at least one unmanned aerial vehicle in each flight group has the same launch time.

According the embodiments of the present disclosure, the division unit is further configured to cyclically perform operations of: determining a number of unmanned aerial vehicles in an i-th flight group; determining whether the first distance between any two unmanned aerial vehicles in the i-th flight group is less than the preset distance or not, in response to determining that the number of unmanned aerial vehicles in the i-th flight group is greater than 1; allocating one of two unmanned aerial vehicles in the i-th flight group into an i+1-th flight group in response to determining that the first distance between the two unmanned aerial vehicles is less than the preset distance; and setting i to i+1 in response to determining that the first distance between every two unmanned aerial vehicles in the i-th flight group is not less than the preset distance, wherein the plurality of unmanned aerial vehicles belong to a first flight group before cyclically performing the operations, $1 \leq i \leq N$.

According the embodiments of the present disclosure, the target position determination module includes: a bipartite graph establishment sub-module configured to establish a bipartite graph according to the launch positions for the plurality of unmanned aerial vehicles and the plurality of target positions; a flight distance determination sub-module configured to determine flight distances of the each unmanned aerial vehicle with respect to the plurality of target positions according to the launch positions for the plurality of unmanned aerial vehicles and the plurality of target positions; a calculation sub-module configured to perform a maximum weight matching calculation on the bipartite graph according to the flight distances of the each unmanned aerial vehicle with respect to the plurality of target positions, so as to obtain a calculation result; and a target position determination sub-module configured to determine the target position for the each unmanned aerial vehicle according to the calculation result, wherein the calculation result is to minimize a sum of the flight distance of each unmanned aerial vehicle of the plurality of unmanned aerial vehicles with respect to the determined target position.

According the embodiments of the present disclosure, the launch position acquisition module includes: a positioning information acquisition sub-module configured to acquire positioning information of the plurality of unmanned aerial vehicles in the launch area; a coordinate origin determination sub-module configured to determine a coordinate origin in the launch area; and a conversion sub-module configured to convert the positioning information of the plurality of unmanned aerial vehicles in the launch area into relative position information with respect to the coordinate origin according to a conversion rule, wherein the relative position information indicates the launch positions for the plurality of unmanned aerial vehicles in the launch area.

Another aspect of the present disclosure provides an unmanned aerial vehicle cluster system, including a plurality of unmanned aerial vehicles and a control device. Each unmanned aerial vehicle includes: a sensor configured to acquire positioning information of the unmanned aerial vehicle in which the sensor is located; and a controller configured to control, according to a flight signal, a flight of the unmanned aerial vehicle in which the controller is located. The controller device includes a memory and a processor. The memory has one or more program instructions stored thereon. The processor is configured to perform, according to the one or more program instructions, operations of: determining launch positions for the plurality of unmanned aerial vehicles in a launch area according to the positioning information of the plurality of unmanned aerial vehicles; acquiring an assembly area corresponding to the launch area, wherein the assembly area includes a plurality of target positions; determining a target position for each unmanned aerial vehicle of the plurality of unmanned aerial vehicles according to the launch positions for the plurality of unmanned aerial vehicles and the plurality of target positions; and transmitting a flight signal to the controller of the each unmanned aerial vehicle according to the launch position for the each unmanned aerial vehicle and the target position for the each unmanned aerial vehicle.

According to the embodiments of the present disclosure, the processor is configured to transmit the flight signal by: determining a flight path of the each unmanned aerial vehicle according to the launch position for the each unmanned aerial vehicle and the target position for the each unmanned aerial vehicle; determining a first distance between any two unmanned aerial vehicles of the plurality of unmanned aerial vehicles according to the flight paths of the any two unmanned aerial vehicles; determining a launch time of the each unmanned aerial vehicle according to the first distance between the any two unmanned aerial vehicles; and transmitting a flight signal to the each unmanned aerial vehicle according to the launch time of the each unmanned aerial vehicle and the flight path of the each unmanned aerial vehicle, wherein the first distance between the any two unmanned aerial vehicles is a shortest distance between the flight paths of the any two unmanned aerial vehicles.

According to the embodiments of the present disclosure, the determining a launch time of the each unmanned aerial vehicle according to the first distance between the any two unmanned aerial vehicles includes: dividing the plurality of unmanned aerial vehicles into N flight groups according to the first distance between the any two unmanned aerial vehicles, where N is an integer greater than 1; and determining a launch time of each flight group of the N flight groups, wherein each flight group includes at least one unmanned aerial vehicle, and in a case that any flight group of the N flight groups includes more than one unmanned aerial vehicles, the first distance between any two unmanned aerial vehicles of the more than one unmanned aerial vehicles is not less than a preset distance; different flight groups have different launch times, and the at least one unmanned aerial vehicle in each flight group has the same launch time.

According to the embodiments of the present disclosure, the dividing the plurality of unmanned aerial vehicles into N flight groups according to the first distance between the any two unmanned aerial vehicles includes cyclically performing operations of: determining a number of unmanned aerial vehicles in an i-th flight group; determining whether the first distance between any two unmanned aerial vehicles in the i-th flight group is less than the preset distance or not, in response to determining that the number of unmanned aerial vehicles in the i-th flight group is greater than 1; allocating one of two unmanned aerial vehicles in the i-th flight group into an i+1-th flight group in response to determining that the first distance between the two unmanned aerial vehicles is less than the preset distance; and setting i to i+1 in response to determining that the first distance between every two unmanned aerial vehicles in the i-th flight group is not less than the preset distance, wherein the plurality of unmanned aerial vehicles belong to a first flight group before cyclically performing the operations, $1 \leq i \leq N$.

According to the embodiments of the present disclosure, the determining a target position for each unmanned aerial vehicle of the plurality of unmanned aerial vehicles according to the launch positions for the plurality of unmanned aerial vehicles and the plurality of target positions includes: establishing a bipartite graph according to the launch positions for the plurality of unmanned aerial vehicles and the plurality of target positions; determining flight distances of the each unmanned aerial vehicle with respect to the plurality of target positions according to the launch positions for the plurality of unmanned aerial vehicles and the plurality of target positions; performing a maximum weight matching calculation on the bipartite graph according to the flight distances of the each unmanned aerial vehicle with respect to the plurality of target positions, so as to obtain a calculation result; and determining the target position for the each unmanned aerial vehicle according to the calculation result, wherein the calculation result is to minimize a sum of the flight distance of each unmanned aerial vehicle of the plurality of unmanned aerial vehicles with respect to the target position determined.

According to the embodiments of the present disclosure, the determining the launch positions for the plurality of unmanned aerial vehicles in the launch area according to the positioning information of the plurality of unmanned aerial vehicles includes: determining a coordinate origin in the launch area; and converting the positioning information of the plurality of unmanned aerial vehicles into relative position information with respect to the coordinate origin according to a conversion rule, wherein the relative position information indicates the launch positions for the plurality of unmanned aerial vehicles in the launch area.

According to the embodiments of the present disclosure, the control device is provided in any unmanned aerial vehicle of the plurality of unmanned aerial vehicles.

Another aspect of the present disclosure provides a system of launching an unmanned aerial vehicle cluster, including: one or more processors; and a storage device for storing one or more programs, wherein the one or more programs, when executed by the one or more processors, cause the one or more processors to perform the method of launching the unmanned aerial vehicle cluster described above.

Another aspect of the present disclosure provides a computer-readable medium having executable instructions stored thereon, wherein the instructions, when executed by a processor, cause the processor to perform the method of launching the unmanned aerial vehicle cluster described above.

Another aspect of the present disclosure provides a computer program containing computer-executable instructions, and the instructions, when executed, are allowed to perform the method of launching the unmanned aerial vehicle cluster described above.

BRIEF DESCRIPTION OF THE DRAWINGS

The accompanying drawings are used to provide a further understanding of the present disclosure and constitute a part of the specification. Together with the following specific embodiments, they are used to explain the present disclosure, but do not constitute a limitation to the present disclosure.

DETAILED DESCRIPTION OF EMBODIMENTS

Figure 1:
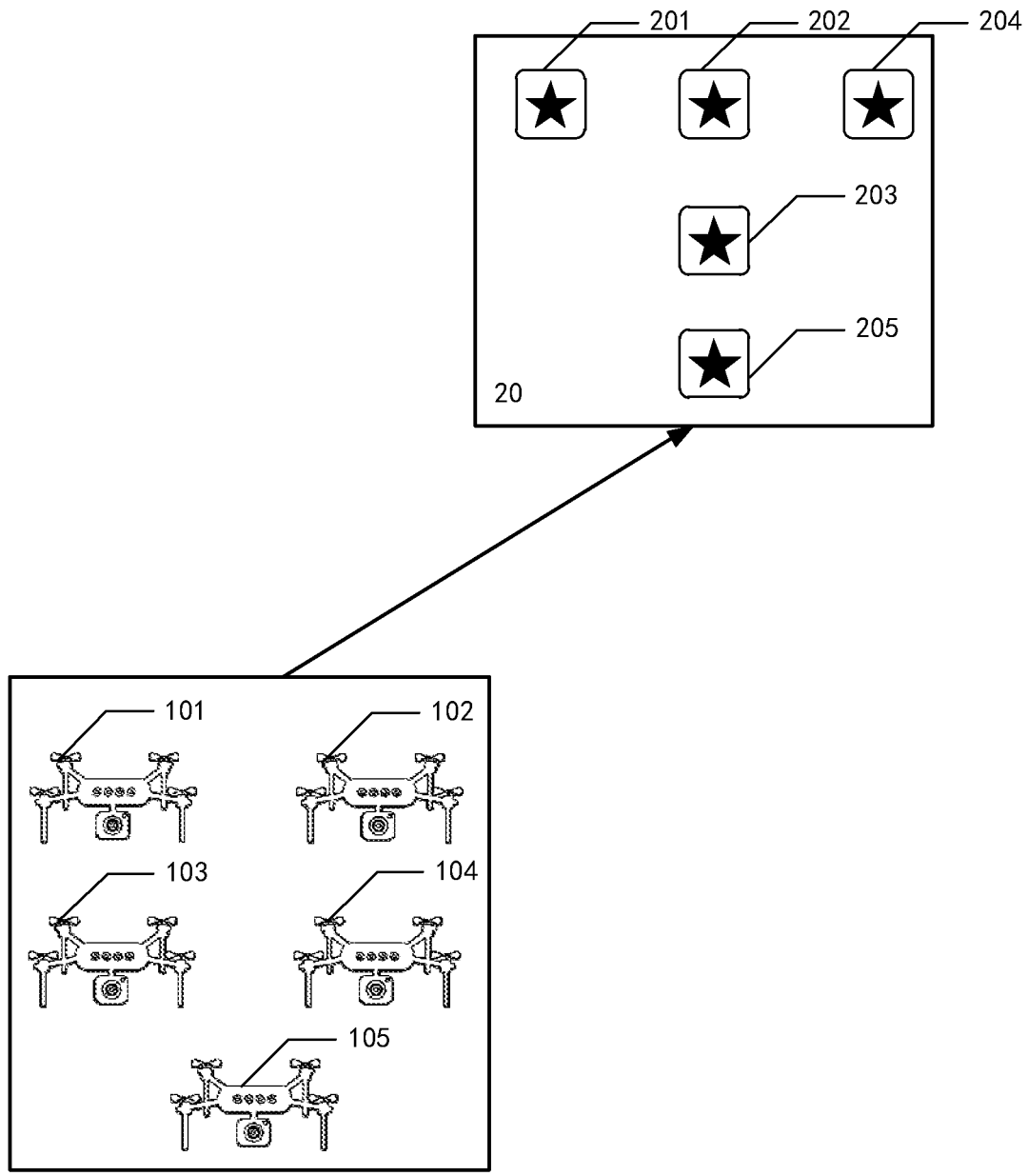
FIG. 1 schematically shows an application scene of an unmanned aerial vehicle cluster system, a launch control method, a launch control apparatus, a launch control system, and a readable medium according to the embodiments of the present disclosure.

Embodiments of the present disclosure will be described below with reference to the drawings. It should be understood, however, that these descriptions are merely exemplary and are not intended to limit the scope of the present disclosure. In the following detailed description, for ease of interpretation, many specific details are set forth to provide a comprehensive understanding of the embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "comprising", "including", etc. used herein indicate the presence of the feature, step, operation and/or part, but do not exclude the presence or addition of one or more other features, steps, operations or parts.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In a case of using the expression similar to "at least one of A, B and C", it should be explained according to the meaning of the expression generally understood by those skilled in the art (for example, "a system including at least one of A, B and C" should include but not be limited to a system including only A, a system including only B, a system including only C, a system including A and B, a system including A and C, a system including B and C, and/or a system including A, B and C). In a case of using the expression similar to "at least one of A, B or C", it should be explained according to the meaning of the expression generally understood by those skilled in the art (for example, "a system including at least one of A, B or C" should include but not be limited to a system including only A, a system including only B, a system including only C, a system including A and B, a system including A and C, a system including B and C, and/or a system including A, B and C).

At present, how to solve the collision problem is generally considered from a perspective of an initial placement position for the unmanned aerial vehicle on the ground. Specifically, the collision problem is solved by placing the unmanned aerial vehicles on the ground in a specified number sequence according to a relative position during assembly. Further, it is necessary to appropriately increase a distance between two adjacent unmanned aerial vehicles so that there is a sufficient safety space during the unmanned aerial vehicle launch.

The above method to solve the collision problem has following defects. Each unmanned aerial vehicle needs to be assigned a number manually. Therefore, when the formation includes a large number of unmanned aerial vehicles, it is time-consuming to manually assign the numbers one by one, and when an unmanned aerial vehicle fails and needs to be replaced, it is also necessary to continue to assign numbers to the substitution. Furthermore, there are many restrictions on the placement of unmanned aerial vehicles. On the one hand, the unmanned aerial vehicle with a specified number needs to be placed in a specified position. An incorrect placement may cause collision between unmanned aerial vehicles, and therefore result in a failure of the formation launch task. On the other hand, the placement of unmanned aerial vehicles is greatly affected by limiting factors such as ground space, environment, and so on. Therefore, the placement of unmanned aerial vehicles is often difficult to meet the requirements of assembly formation.

The embodiments of the present disclosure provide a method, apparatus, system for launching an unmanned aerial vehicle cluster and a readable medium. The unmanned aerial vehicle cluster includes a plurality of unmanned aerial vehicles located in a launch area. The method of launching the unmanned aerial vehicle cluster includes: acquiring launch positions for the plurality of unmanned aerial vehicles in the launch area; acquiring an assembly area corresponding to the launch area, wherein the assembly area includes a plurality of target positions; determining a target position for each unmanned aerial vehicle of the plurality of unmanned aerial vehicles according to the launch positions for the plurality of unmanned aerial vehicles and the plurality of target positions; and launching the plurality of unmanned aerial vehicles according to the launch position for each unmanned aerial vehicle of the plurality of unmanned aerial vehicles and the target position for each unmanned aerial vehicle.

FIG. 1 schematically shows an application scene of the unmanned aerial vehicle cluster, the launch control method, the launch control apparatus, the launch control system and the readable medium according to the embodiments of the present disclosure. It should be noted that FIG. 1 only shows an example of the application scene in which the embodiments of the present disclosure may be applied so as to help those skilled in the art understand technical contents of the present disclosure. It does not mean that the embodiments of the present disclosure may not be used for other apparatuses, systems, environments or scenes.

As shown in FIG. 1, a launch area 10 is provided in the application scene, and an unmanned aerial vehicle cluster including unmanned aerial vehicles 101 to 105 is placed in the launch area 10.

The launch area 10 may be specifically, for example, a flat area on a ground and serve as a launch site for the unmanned aerial vehicles. The launch area 10 corresponds to an assembly area 20 according to a geographic location of the launch area 10 (for example, longitude, latitude, and height), and the assembly area 20 is used to define a spatial range in which the unmanned aerial vehicle cluster assembles after launch.

According to the requirements of arranging the unmanned aerial vehicle cluster to perform tasks, the assembly area 20 may include predetermined target positions, for example, target positions 201 to 205. A number of the target positions is the same as that of the unmanned aerial vehicles in the unmanned aerial vehicle cluster, so that the unmanned aerial vehicle cluster, after flying to the target positions in the assembly area, may be arranged in a formation corresponding to the task, such as a "T" formation shown in FIG. 1. An arrangement of the target positions depends on the formation of the unmanned aerial vehicle cluster in the assembly area. It may be understood that the arrangement of the target positions and the formation of the unmanned aerial vehicle cluster in the assembly area shown in FIG. 1 are only examples to facilitate the understanding of the present disclosure, and the arrangement and formation may be set according to specific tasks. For example, the unmanned aerial vehicle cluster may also be arranged in a "D" formation, a "flying bird" formation, an oval formation, or a diamond formation in the assembly area, which is not limited in the present disclosure.

The unmanned aerial vehicles 101 to 105 may be specifically multi-rotor unmanned aerial vehicles, unmanned helicopters, or fixed-wing unmanned aerial vehicles. Considering advantages of multi-rotor unmanned aerial vehicle such as accurate positioning, flexible position tracking and capability of hovering, the unmanned aerial vehicles 101 to 105 in the embodiments of the present disclosure are preferably multi-rotor unmanned aerial vehicles.

The method of launching the unmanned aerial vehicle cluster provided by the present disclosure may specifically include: firstly determining the assembly area 20 according to the launch area 10, and determining a number and a distribution of the target positions in the assembly area according to task requirements; then assigning an appropriate target position to each unmanned aerial vehicle according to the launch positions for the unmanned aerial vehicle cluster in the launch area, and launching each unmanned aerial vehicle so that the unmanned aerial vehicle cluster is arranged in a pattern corresponding to the task requirements in the assembly area when each unmanned aerial vehicle flies to the assigned target position.

Considering that the launching of the unmanned aerial vehicle cluster is implemented by determining a flight path in real time according to the launch position for the unmanned aerial vehicle instead of by using a preset script path, there is no need to strictly limit the placement position for the unmanned aerial vehicle cluster in the launch area before launching of the unmanned aerial vehicle cluster according to the embodiments of the present disclosure is performed, as long as the placement of the unmanned aerial vehicles satisfies basic launch conditions (for example, a distance between any two unmanned aerial vehicles is about 0.5 m to 1 m). Therefore, the requirements of the unmanned aerial vehicle cluster on a space environment of the launch site may be reduced, which may facilitate an execution of the task of arranging in formation.

It may be understood that the launch area, the assembly area, the number of the unmanned aerial vehicles in the unmanned aerial vehicle cluster, the placement positions for the unmanned aerial vehicles in the launch area, the number of the target positions, and the distribution of the target positions in the assembly area shown in FIG. 1 are only schematic. The positions for the launch area and the assembly area, and the number of the unmanned aerial vehicles and the target positions may be set arbitrarily according to implementation needs.

The embodiments of the present disclosure may at least partially mitigate the large time consumption caused by manually assigning numbers one by one for the launch of the unmanned aerial vehicle cluster in a related art. By the method of determining the target positions for the unmanned aerial vehicles according to the launch positions for the unmanned aerial vehicles and launching the unmanned aerial vehicles according to the launch positions and the target positions, the process of manually assigning numbers one by one may be eliminated, the time consumption in manual operation may be reduced, and the requirements for the launch site may be reduced.

Figure 2:
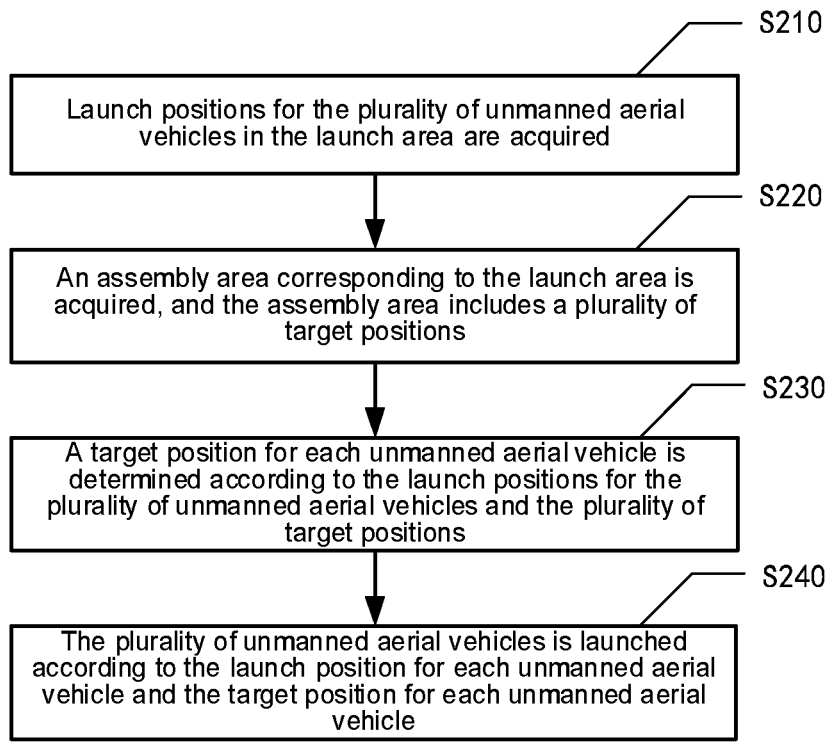
FIG. 2 schematically shows a flowchart of a method of launching an unmanned aerial vehicle cluster according to the embodiments of the present disclosure.

FIG. 2 schematically shows a flowchart of the method of launching the unmanned aerial vehicle cluster according to the embodiments of the present disclosure.

As shown in FIG. 2, the method of launching the unmanned aerial vehicle cluster according to the embodiments of the present disclosure may include operation S210 to operation S240.

The unmanned aerial vehicle cluster may include a plurality of unmanned aerial vehicles located in the launch area, for example, unmanned aerial vehicles 101 to 105 located in the launch area 10 in FIG. 1. Accordingly, for example, before performing the operation S210, it is also possible to place the unmanned aerial vehicles in the launch area manually. In placing the unmanned aerial vehicles, the launch area may be selected according to the condition of the launch site, and the plurality of unmanned aerial vehicles may be placed in the selected launch area as evenly as possible. The distance between two adjacent unmanned aerial vehicles is set to at least meet a minimum requirement for the launch of unmanned aerial vehicle. For example, the distance between any two adjacent unmanned aerial vehicles may be 0.5 m to 1 m.

In operation S210, the launch positions for the plurality of unmanned aerial vehicles in the launch area are acquired.

According to the embodiments of the present disclosure, the launch positions for the plurality of unmanned aerial vehicles may be obtained specifically by manual measurement. The measurement may specifically include determining coordinate values of the positions for the plurality of unmanned aerial vehicles by taking a certain position as a coordinate origin. The coordinate value of an i-th unmanned aerial vehicle may be represented as $p_i$ ($x_i$, $y_i$, $z_i$).

According to the embodiments of the present disclosure, in order to further reduce the labor time, the launch positions for the plurality of unmanned aerial vehicles may also be automatically detected by a positioning system. Accordingly, the operation S210 may specifically include firstly turning on the plurality of unmanned aerial vehicles, and keeping the plurality of unmanned aerial vehicles in a launch standby state. Then, a ground station may acquire launch GPS positioning information of the unmanned aerial vehicles by using a communication link through a GPS positioning function of the unmanned aerial vehicles. The positioning information of the i-th unmanned aerial vehicle may include, for example, a longitude, a latitude and a height of the unmanned aerial vehicle, and may be specifically represented as $p_i$ ($lon_i$, $lat_i$, $h_i$), for example.

According to the embodiments of the present disclosure, in order to facilitate subsequent processing, after the launch GPS positioning information of the unmanned aerial vehicle is acquired, the positioning information may be converted, for example, into a rectangular coordinate representation to facilitate a subsequent determination of the target position. The details may refer to the description for FIG. 3.

In operation S220, the assembly area corresponding to the launch area is acquired, and the assembly area includes a plurality of target positions.

According to the embodiments of the present disclosure, generally, in order to facilitate unified management and to ensure a smooth execution of the assembly, each launch site corresponds to a preset assembly area. The assembly area may be specifically an area at a certain height above the launch area and has an offset with respect to the launch area in a horizontal direction. Therefore, the assembly area may be determined after the launch site is determined. The operation S220 may specifically include determining the corresponding assembly area according to the position of the launch area (for example, longitude, latitude and height that may uniquely represent the position information of the launch area).

According to the embodiments of the present disclosure, the assembly area includes a plurality of target positions. Considering that the task of arranging in formation has been determined before launching the unmanned aerial vehicle cluster and an appropriate assembly pattern is preset for the determined task of arranging in formation, the operation S220 may further include an operation of determining the assembly pattern according to the task of arranging in formation, and determining the plurality of target positions in the assembly area according to the assembly pattern.

According to the embodiments of the present disclosure, an i-th target position of the plurality of target positions may be specifically represented by $R_i$, and a coordinate value of the i-th target position may be specifically represented, for example, by using a certain point on the ground as a coordinate origin. More specifically, in order to facilitate a subsequent control of the launch, for example the target position and the launch position for the unmanned aerial vehicle may be represented in one and the same coordinate system, which is not limited in the present disclosure.

In operation S230, the target position for each unmanned aerial vehicle of the plurality of unmanned aerial vehicles is determined according to the launch positions for the plurality of unmanned aerial vehicles and the plurality of target positions.

According to the embodiments of the present disclosure, in order to execute the task of arranging in formation, each unmanned aerial vehicle of the plurality of unmanned aerial vehicles uniquely correspond to one of the plurality of target positions when the plurality of unmanned aerial vehicles fly to the assembly area, so that the plurality of unmanned aerial vehicles may be assembled in an appropriate assembly pattern in the assembly area. Therefore, by operating S230, the launch positions may be associated with the target positions in one-to-one correspondence, that is, the unique target position for each unmanned aerial vehicle may be determined.

According to the embodiments of the present disclosure, considering that there may be collision in a process of the launch of the plurality of unmanned aerial vehicles, the target position for each unmanned aerial vehicle is determined in the operation S230 in such a manner that connecting lines between the launch positions for the plurality of unmanned aerial vehicles and respective target positions do not intersect.

According to the embodiments of the present disclosure, considering that the available energy of the unmanned aerial vehicle during flight is constant, the target position for each unmanned aerial vehicle is determined in the operation S230 in such a manner that a total length of a flight path of each unmanned aerial vehicle from the launch position to the target position is almost the same and an average length of the flight paths of the plurality of unmanned aerial vehicles from the launch positions to the target positions is minimized, in order to execute the task of arranging in formation successfully.

According to the embodiments of the present disclosure, in determining the target position for the unmanned aerial vehicle in operation S230, various factors may be considered according to practical requirements and the target position may be determined in various manners, which is not limited in the present disclosure. For example, the operation S230 may be performed as described in FIG. 4, which is not described in detail here.

In operation S240, the plurality of unmanned aerial vehicles is launched according to the launch position for each unmanned aerial vehicle of the plurality of unmanned aerial vehicles and the target position for each unmanned aerial vehicle.

After the launch position and target position for the unmanned aerial vehicle are determined, a flight path and a launch time of each unmanned aerial vehicle may be set, and the unmanned aerial vehicle may be controlled to fly according to the flight path at the set launch time. Therefore, the operation S240 may specifically include firstly determining the flight path of each unmanned aerial vehicle according to the launch position and the target position for each unmanned aerial vehicle.

According to the embodiments of the present disclosure, considering that even if the flight paths do not intersect, two unmanned aerial vehicles are still likely to deviate from the paths and collide under the interaction force due to a close distance during the launch process, then the operation S240 may further include determining the launch time according to the flight path after the flight path is determined, so that the two unmanned aerial vehicles that are likely to collide may launch at different time instants. Finally, the plurality of unmanned aerial vehicles may be launched according to the determined launch time and the flight path, so that the plurality of unmanned aerial vehicles is assembled in a preset pattern in the assembly area. According to the embodiments of the present disclosure, the specific implementation of the operation S240 may refer to, for example, the description for FIG. 5 to FIG. 6B, which will not be described in detail here.

Accordingly, with the method of launching the unmanned aerial vehicle cluster according to the embodiments of the present disclosure, instead of launching the unmanned aerial vehicle towards a predetermined target position according to a preset script path, the target position is determined in real time according to the launch position for the unmanned aerial vehicle, and then the unmanned aerial vehicle is launched according to the determined target position. In this way, restrictions on the placement of the unmanned aerial vehicles may be reduced, for example, there is no need to place the unmanned aerial vehicles in a predetermined position in advance, and there is no need to pre-assign numbers for the unmanned aerial vehicles. The time consumption in manual operation may be effectively reduced, and the collision of two unmanned aerial vehicles caused by the incorrect placement may be avoided. In this way, a successful execution of formation task may be effectively ensured. Furthermore, since the restrictions on the placement of unmanned aerial vehicles are reduced, the requirements on the space and environment of the launch site may also be reduced to a certain extent, so that the difficulty of performing task of arranging in formation may be reduced.

Figure 3:
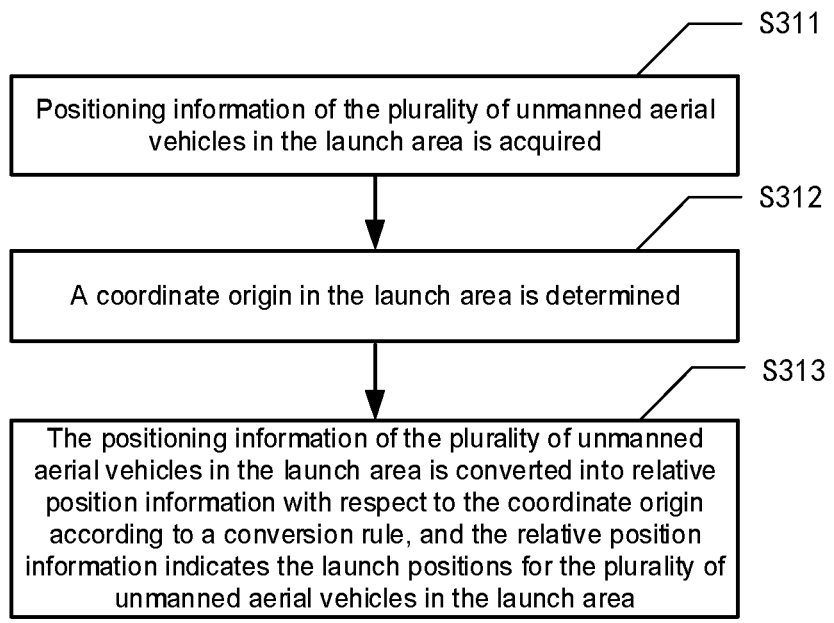
FIG. 3 schematically shows a flowchart of acquiring a launch position for an unmanned aerial vehicle according to the embodiments of the present disclosure.

FIG. 3 schematically shows a flowchart of acquiring the launch position for the unmanned aerial vehicle according to the embodiments of the present disclosure.

As shown in FIG. 3, the process of acquiring the launch position for the unmanned aerial vehicle in operation S210 may specifically include operation S311 to operation S313.

In operation S311, positioning information of the plurality of unmanned aerial vehicles in the launch area is acquired.

According to the embodiments of the present disclosure, the positioning information of the unmanned aerial vehicles in the launch area acquired in operation S311 may be specifically GPS positioning information that may be specifically acquired by a ground station using a communication link. The GPS positioning information may contain the longitude, latitude and height of the unmanned aerial vehicle. Assuming that there are M unmanned aerial vehicles, M groups of different positioning information may be acquired in total in operation S211. The i-th group of positioning information may be denoted as $p_i$ ($lon_i$, $lat_i$, $h_i$), where $lon_i$ represents a longitude value, $lat_i$ represents a latitude value, and $h_i$ represents a height value.

According to the embodiments of the present disclosure, in order to facilitate the acquisition of the positioning information, before performing the operation S311, the plurality of unmanned aerial vehicles may be, for example, turned on and kept in a launch standby state to enable the GPS positioning function of the unmanned aerial vehicles.

In operation S312, a coordinate origin in the launch area is determined. In operation S313, the positioning information of the plurality of unmanned aerial vehicles in the launch area is converted into relative position information with respect to the coordinate origin according to a conversion rule. The relative position information may indicate the launch positions for the plurality of unmanned aerial vehicles in the launch area.

According to the embodiments of the present disclosure, through operation S312 to operation S313, the positioning information $p_i$ ($lon_i$, $lat_i$, $h_i$) may be converted, for example, into $p_i$ ($x_i$, $y_i$, $z_i$). That is, through operation S312 to operation S313, global position coordinates of the unmanned aerial vehicle may be converted into local coordinates with respect to the coordinate origin, so as to facilitate the determination of the target position for the unmanned aerial vehicle in operation S230.

According to the embodiments of the present disclosure, the conversion rule in operation S230 may be specifically a conversion rule for converting global coordinates into rectangular coordinates. The conversion rule may be specifically represented, for example, by Equation (1) to Equation (3) as follows:

$$x_i = K[\cos(lat_{ref}) * \sin(lat_i) - \sin(lat_{ref}) * \cos(lat_i) * \cos(lon_i - lon_{ref})]R_e \quad \text{Equation (1)}$$

$$y_i = K\cos(lat_i)\sin(lon_i - lon_{ref}) * R_e \quad \text{Equation (2)}$$

$$z_i = -(h_i - h_{ref}) \quad \text{Equation (3)}$$

$$\text{where } K = \frac{\cos^{-1} c}{\sin(\cos^{-1} c)} \quad \text{Equation (4)}$$

$$c = \sin(lat_{ref})\sin(lat_i) + \cos(lat_{ref})\cos(lat_i)\cos(lon_i - lon_{ref}) \quad \text{Equation (5)}$$

where $lat_{ref}$, $lon_{ref}$ and $h_{ref}$ represent a longitude value, a latitude value and a height value of the coordinate origin, respectively.

Figure 4:
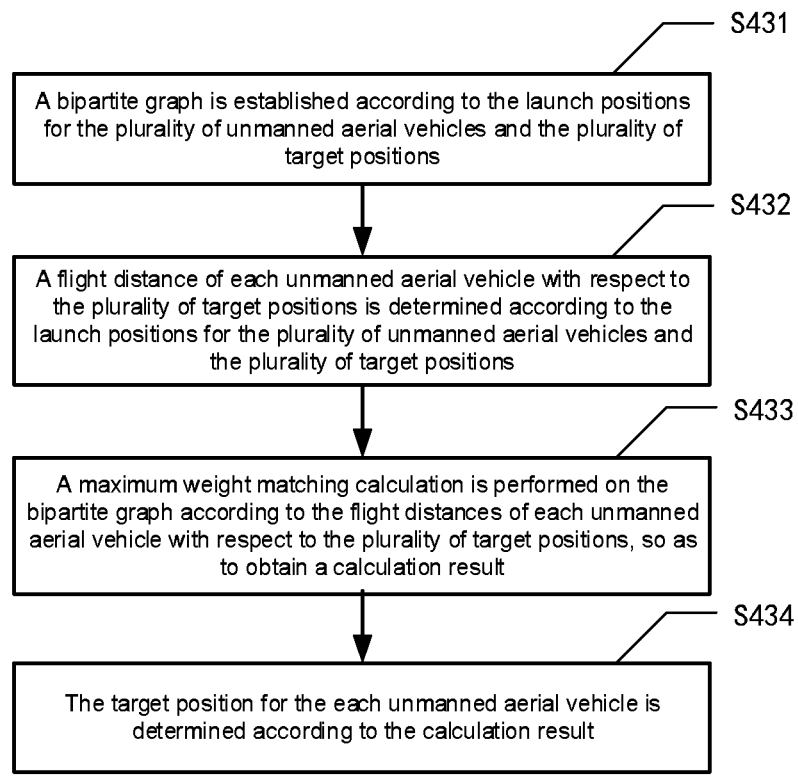
FIG. 4 schematically shows a flowchart of determining a target position for each unmanned aerial vehicle according to the embodiments of the present disclosure.

FIG. 4 schematically shows a flowchart of determining the target position for each unmanned aerial vehicle according to the embodiments of the present disclosure.

As shown in FIG. 4, the process of determining the target position for the unmanned aerial vehicle in operation S230 may specifically include operation S431 to operation S434.

In operation S431, a bipartite graph is established according to the launch positions for the plurality of unmanned aerial vehicles and the plurality of target positions.

According to the embodiments of the present disclosure, operation S431 may specifically include: determining the plurality of launch positions as a point set, determining the plurality of target positions as a point set, and establishing a bipartite graph between the two point sets, so that one of the two endpoints of each edge is the launch position, and the other of the two endpoints is the target position. Specifically, if a set of coordinate values of the plurality of launch positions is denoted as S, and a set of coordinate values of the plurality of target positions is denoted as R, then in the established bipartite graph, the edge obtained by connecting an i-th launch position and a j-th target position may be represented as $V_{ij}$.

According to the embodiments of the present disclosure, the bipartite graph established in operation S431 may be specifically a complete bipartite graph with weights, in which a weight is an opposite number of the distance between the launch position and the target position, i.e. an opposite number of a length of the edge $V_{ij}$. In this manner, a sum of the flight distances of the plurality of unmanned aerial vehicles is minimized and each unmanned aerial vehicle has a unique target position, In operation S432, flight distances of each unmanned aerial vehicle with respect to the plurality of target positions are determined according to the launch positions for the plurality of unmanned aerial vehicles and the plurality of target positions.

According to the embodiments of the present disclosure, the operation S432 may specifically include calculating a distance between each launch position and each target position of the plurality of target positions one by one so as to obtain a plurality of distance values. Assuming that there are M launch positions and M target positions, $M^2$ distance values may be obtained.

According to the embodiments of the present disclosure, in order to facilitate the calculation of the flight distance, the coordinate value of the launch position and the coordinate value of the target position here may be represented, for example, based on the same coordinate system. For example, in a case that the coordinate value of the launch position is the local coordinate obtained by operation S313 in FIG. 3, the coordinate values of the plurality of target positions acquired in operation S220 are also the local coordinates with respect to the coordinate origin in operation S312.

In operation S433, a maximum weight matching calculation is performed on the bipartite graph according to the flight distance of each unmanned aerial vehicle with respect to the plurality of target positions, so as to obtain a calculation result. In operation S434, the target position for each unmanned aerial vehicle is determined according to the calculation result.

According to the embodiments of the present disclosure, operation S433 may be specifically performed, for example, by using a KM algorithm (Kuhn-Munkres algorithm) to obtain the maximum weight matching of the bipartite graph under complete matching, so as to maximize a sum of the weights of all matched edges. Considering that the weight is the opposite number of the length of the edge $V_{ij}$, the calculation result obtained by performing the maximum weight matching calculation using the KM algorithm is a result with a minimum sum of distances. That is, the calculation result may minimize the sum of the flight distance of each unmanned aerial vehicle of the plurality of unmanned aerial vehicles with respect to the determined target position.

According to the embodiments of the present disclosure, since each point in the set S may be assigned with a corresponding point in the set R under the calculation result obtained by the maximum weight matching of the bipartite graph under complete matching, a correspondence between the launch position and the target position may be determined from the calculation result. Moreover, since the launch position uniquely represents an unmanned aerial vehicle, the target position for each unmanned aerial vehicle may be determined directly according to the calculation result.

Accordingly, through the operation S431 to operation S434, a sum of the distances between the launch positions for the plurality of unmanned aerial vehicles and the corresponding target positions may be minimized, so that the electric energy stored in the unmanned aerial vehicles may be saved. Moreover, because the KM algorithm is used for the maximum weight matching calculation, it may be ensured that the lines from the launch positions to the target positions for the plurality of unmanned aerial vehicles do not intersect, so that the collision during the launch process of unmanned aerial vehicles may be avoided in some extent.

Figure 5:
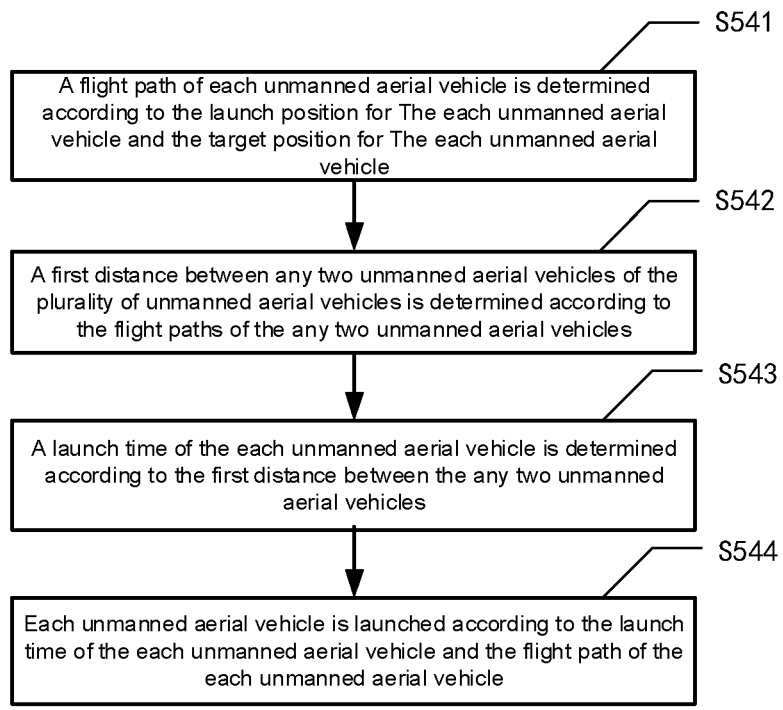
FIG. 5 schematically shows a flowchart of launching the unmanned aerial vehicles according to the embodiments of the present disclosure.

FIG. 5 schematically shows a flowchart of launching unmanned aerial vehicles according to the embodiments of the present disclosure.

As shown in FIG. 5, the process of launching the plurality of unmanned aerial vehicles in operation S240 may specifically include operation S541 to operation S544.

In operation S541, a flight path of each unmanned aerial vehicle is determined according to the launch position for each unmanned aerial vehicle and the target position for each unmanned aerial vehicle.

According to the embodiments of the present disclosure, in order to minimize a total energy consumption of each unmanned aerial vehicle flying from the launch position to the target position, the flight path of each unmanned aerial vehicle determined in operation S541 may be specifically, for example, a connecting line between the launch position and the target position for each unmanned aerial vehicle.

According to the embodiments of the present disclosure, considering that the unmanned aerial vehicle generally rises to a predetermined height firstly and then flies to the target position in launching, the flight path of each unmanned aerial vehicle determined in operation S541 may be specifically a path formed by a combination of a line from the launch position to a predetermined position at a predetermined height above the launch position and a line from the predetermined position to the target position. In this case, in order to ensure the accuracy of the target position determined for the unmanned aerial vehicle, the predetermined position may also be used as the launch position described in operation S431 in FIG. 4, which will not be repeated here.

In operation S542, a first distance between any two unmanned aerial vehicles of the plurality of unmanned aerial vehicles is determined according to the flight paths of the any two unmanned aerial vehicles. The first distance is a shortest distance between the flight paths of the any two unmanned aerial vehicles.

In operation S543, a launch time of each unmanned aerial vehicle is determined according to the first distance between the any two unmanned aerial vehicles.

According to the embodiments of the present disclosure, the operation S543 may specifically include: setting different launch times for the two unmanned aerial vehicles in a case that the first distance between the two unmanned aerial vehicles is less than a preset distance, so as to avoid collision between the two unmanned aerial vehicles during flying to the target position; and setting the same launch time for the two unmanned aerial vehicles in a case that the first distance between the two unmanned aerial vehicles is not less than the preset distance, so as to improve the assembly efficiency of the plurality of unmanned aerial vehicles.

According to the embodiments of the present disclosure, the operation S543 may also be implemented, for example, by using the method described later with reference to FIG. 6A to FIG. 6B, which will not be described in detail here.

In operation S544, each unmanned aerial vehicle is launched according to the launch time of each unmanned aerial vehicle and the flight path of each unmanned aerial vehicle, to enable each unmanned aerial vehicle of the plurality of unmanned aerial vehicles to take off at the launch time and fly according to the flight path, so that the plurality of unmanned aerial vehicles may fly to the corresponding target positions and being arranged in a desired pattern in the assembly area.

Figure 6A:
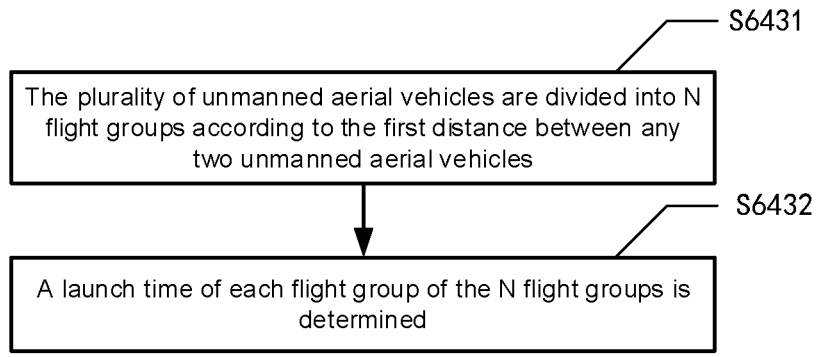
FIG. 6A schematically shows a flowchart of determining launch times of a plurality of unmanned aerial vehicles according to the embodiments of the present disclosure.

FIG. 6A schematically shows a flowchart of determining the launch time of the plurality of unmanned aerial vehicles according to the embodiments of the present disclosure. FIG. 6B schematically shows a flowchart of dividing the plurality of unmanned aerial vehicles into N flight groups according to the embodiments of the present disclosure.

As shown in FIG. 6A, the operation S543 in FIG. 5 may specifically include operation S6431 and operation S6432.

In operation S6431, the plurality of unmanned aerial vehicles are divided into N flight groups according to the first distance between any two unmanned aerial vehicles, where N is an integer greater than 1. In operation S6432, the launch time of each flight group of the N flight groups is determined.

According to the embodiments of the present disclosure, in a case that the first distance between two unmanned aerial vehicles is less than the preset distance, considering that the two unmanned aerial vehicles are likely to collide during flying to the target positions, the two unmanned aerial vehicles may be divided into different flight groups, and finally the plurality of unmanned aerial vehicles are divided into N flight groups. By assigning different launch times to the N flight groups, the collision of unmanned aerial vehicles during flight may be effectively avoided. Each flight group includes at least one unmanned aerial vehicle.

According to the embodiments of the present disclosure, in order to ensure that unmanned aerial vehicles with the same launch time may not collide, the first distance of any two unmanned aerial vehicles belonging to the same flight group is not less than the preset distance. According to the embodiments of the present disclosure, the preset distance may be, for example, a minimum distance to ensure that two unmanned aerial vehicles may not collide.

According to the embodiments of the present disclosure, for example, a launch time $t_1$ may be set for a first flight group of the N flight groups, and a launch time $t_2=t_1+T_{delay}$ may be set for a subsequent second flight group, where $T_{delay}$ represents a delay time between the launch time of the second flight group and the launch time of the first flight group, and so on, such that the launch time of the i-th flight group may be represented as $t_i=t_1+(i-1)T$delay. Specifically, a value of $T_{delay}$ here may be set as desired in practical. For example, is may be taken as an initial value of $T_{delay}$ to determine, by theoretical calculation, whether a collision occurs if the unmanned aerial vehicles is launched according to the set launch time. If there is a collision, the value of $T_{delay}$ may be appropriately increased, for example, to 1.5 s, and then it is determined through theoretical calculation whether there is still a collision or not. If there is still a collision, the value of $T_{delay}$ may be further increased until the value of $T_{delay}$ may ensure that there is no collision. Therefore, the value of $T_{delay}$ may be a minimum value to ensure that there is no collision during the launch of the unmanned aerial vehicle cluster, so as to effectively ensure the launch efficiency of the unmanned aerial vehicle cluster.

Figure 6B:
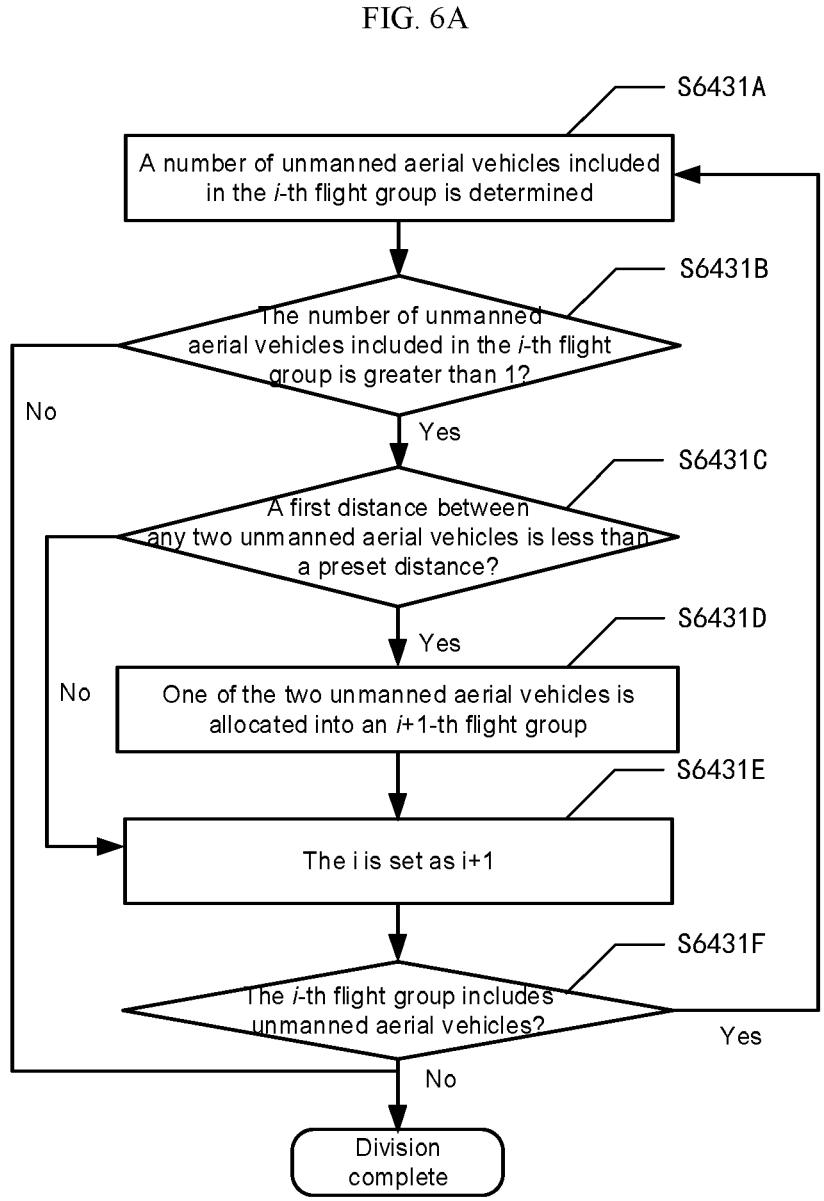
FIG. 6B schematically shows a flowchart of dividing a plurality of unmanned aerial vehicles into N flight groups according to the embodiments of the present disclosure.

According to the embodiments of the present disclosure, as described in FIG. 6B, the operation S6431 in which the plurality of unmanned aerial vehicles are divided into N flight groups may specifically include operation S6431A to operation S6431E that are executed circularly.

In operation S6431A, the number of unmanned aerial vehicles included in the i-th flight group is determined. In operation S6431B, it is determined whether the number of unmanned aerial vehicles included in the i-th flight group is greater than 1 or not. If it is determined that the number of unmanned aerial vehicles included in the i-th flight group is not greater than 1, the cycle is ended because there is no possibility of collision if the unmanned aerial vehicle included in the i-th flight group is launched at the same time. If it is determined that the number of unmanned aerial vehicles included in the i-th flight group is greater than 1, it is desired to determine whether there is a possibility of collision if the plurality of unmanned aerial vehicles included in the i-th flight group launch at the same time. Therefore, operation S6431C is performed to determine whether the first distance between any two unmanned aerial vehicles in the i-th flight group is less than the preset distance or not. If it is determined that the first distance between any two unmanned aerial vehicles in the i-th flight group is not less than the preset distance, it indicates that there is no possibility of collision if the plurality of unmanned aerial vehicles in the i-th flight group are launched at the same time, and thus a determination is performed on an i+1-th flight group. That is, operation S6431E is performed to set i to i+1, and operation S6431F is performed to determine whether the i-th flight group includes unmanned aerial vehicles or not. If so, operation S6431A is performed. Otherwise, a division of the plurality of unmanned aerial vehicles ends. If it is determined that the first distance between two unmanned aerial vehicles in the i-th flight group is less than the preset distance, operation S6431D is performed to distribute one of the two unmanned aerial vehicles into the i+1-th flight group until the first distance between any two unmanned aerial vehicles in the i-th flight group is not less than the preset distance. Then, the determination is performed on the i+1-th flight group. That is, operation S6431E is performed to set i to i+1, and operation S6431F is performed to determine whether the i-th flight group includes unmanned aerial vehicles or not. If the i-th flight group does not include unmanned aerial vehicles, the division of the plurality of unmanned aerial vehicles ends. If the i-th flight group includes unmanned aerial vehicles, operation S6431A is performed.

According to the embodiments of the present disclosure, the first distance between an m-th unmanned aerial vehicle and an n-th unmanned aerial vehicle is denoted as $D_{nm}$, and the preset distance is denoted as $D_{min}$. The operation S6431 may specifically include following step 1 to step 3. In step 1, it is firstly determined whether $D_{nm}$ is less than $D_{min}$ or not. If $D_{nm}<D_{min}$, it indicates that there is a collision risk for the m-th unmanned aerial vehicle and the n-th unmanned aerial vehicle during assembly, and the numbers of the two unmanned aerial vehicles are recorded in two launch groups $I_1$ and $I_2$, respectively. In step 2, after values of m and n are changed, step 1 is repeatedly performed until there is no collision risk for any two unmanned aerial vehicles in the launch group $I_1$. In step 3, determination and distribution are performed on the unmanned aerial vehicles in the launch group $I_2$ so as to form launch group $I_2$ and launch group $I_3$, then step 1 to step 2 are repeatedly performed until there is no collision risk for any two unmanned aerial vehicles in the launch group $I_2$. By analogy, step 1 to step 3 may be repeatedly performed to form launch group $I_1$ to launch group $I_N$, so that there is no collision risk for any two unmanned aerial vehicles in the N launch groups.

It should be noted that i is greater than or equal to 1 and less than or equal to N. Before performing the operation S6431, that is, before cyclically performing the operations in FIG. 6B, the plurality of unmanned aerial vehicles in the launch area shall belong to a first flight group. If a total number of the plurality of unmanned aerial vehicles is M, m is a natural number greater than or equal to 1 and less than or equal to M, n is a natural number greater than or equal to 1 and less than or equal to M, and m≠n.

In summary, according to the embodiments of the present disclosure, the method of determining the launch time of the plurality of unmanned aerial vehicles described with reference to FIG. 6A to FIG. 6B may make two unmanned aerial vehicles with collision possibility launch at different times. In this way, collision events during the launch and assembly of the unmanned aerial vehicle cluster may be effectively avoided, and thus the smooth assembly of the unmanned aerial vehicle cluster and the smooth progress of subsequent task of arranging in formation may be ensured.

Figure 7:
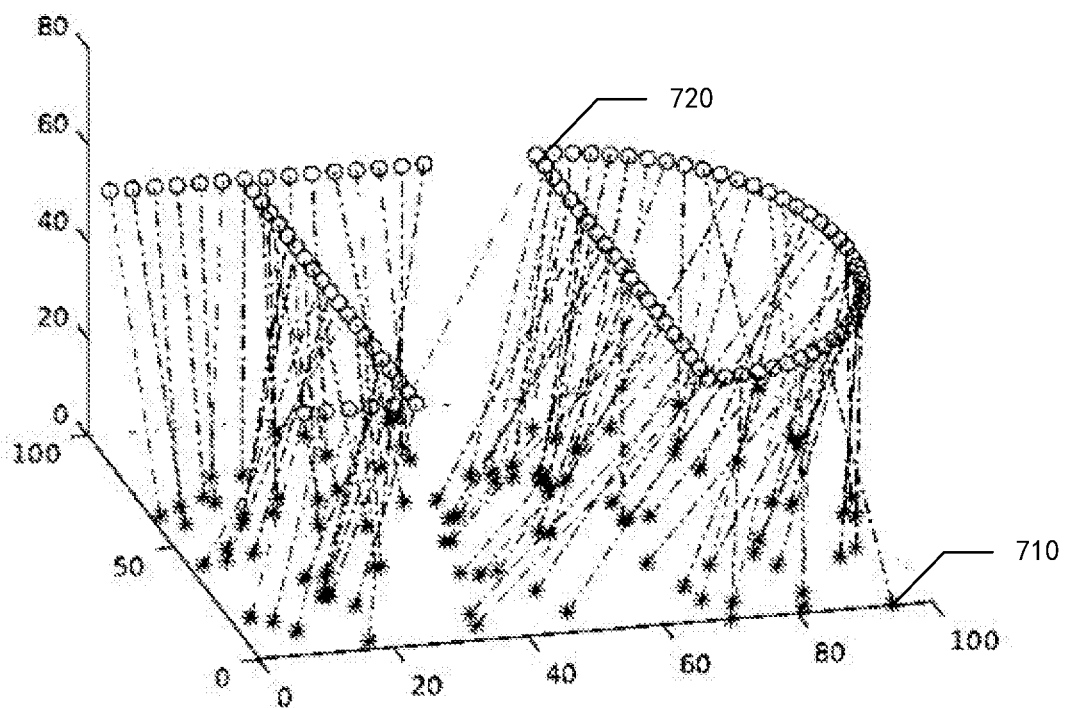
FIG. 7 schematically shows a schematic diagram of an assembly effect of the unmanned aerial vehicles in an assembly area after the launch of the unmanned aerial vehicles according to the embodiments of the present disclosure.

FIG. 7 schematically shows a schematic diagram of an assembly effect of the unmanned aerial vehicles in the assembly area after the launch of the unmanned aerial vehicles according to the embodiments of the present disclosure.

In the embodiments of the present disclosure, the control of the launch of the unmanned aerial vehicle cluster is simulated by using the method described with reference to FIG. 2 to FIG. 6B. A result of simulation is shown in FIG. 7. As shown in FIG. 7, a plurality of unmanned aerial vehicles 710 may be controlled to fly to respective target positions 720, and a pattern of "JD" shown in FIG. 7 may be formed in the assembly area including the plurality of target positions 720.

According to the simulation, with the method of launching the unmanned aerial vehicle cluster in the embodiments of the present disclosure, the assignment of the target positions for the unmanned aerial vehicles is converted into a bipartite graph matching to be solved, and then the launch strategy is optimized by delaying the launch according to the conditions for avoiding collision during the actual flight process, thereby reducing the risk of collision while ensuring the launch efficiency. Therefore a successful execution of subsequent tasks of arranging in formation is facilitated.

Figure 8:
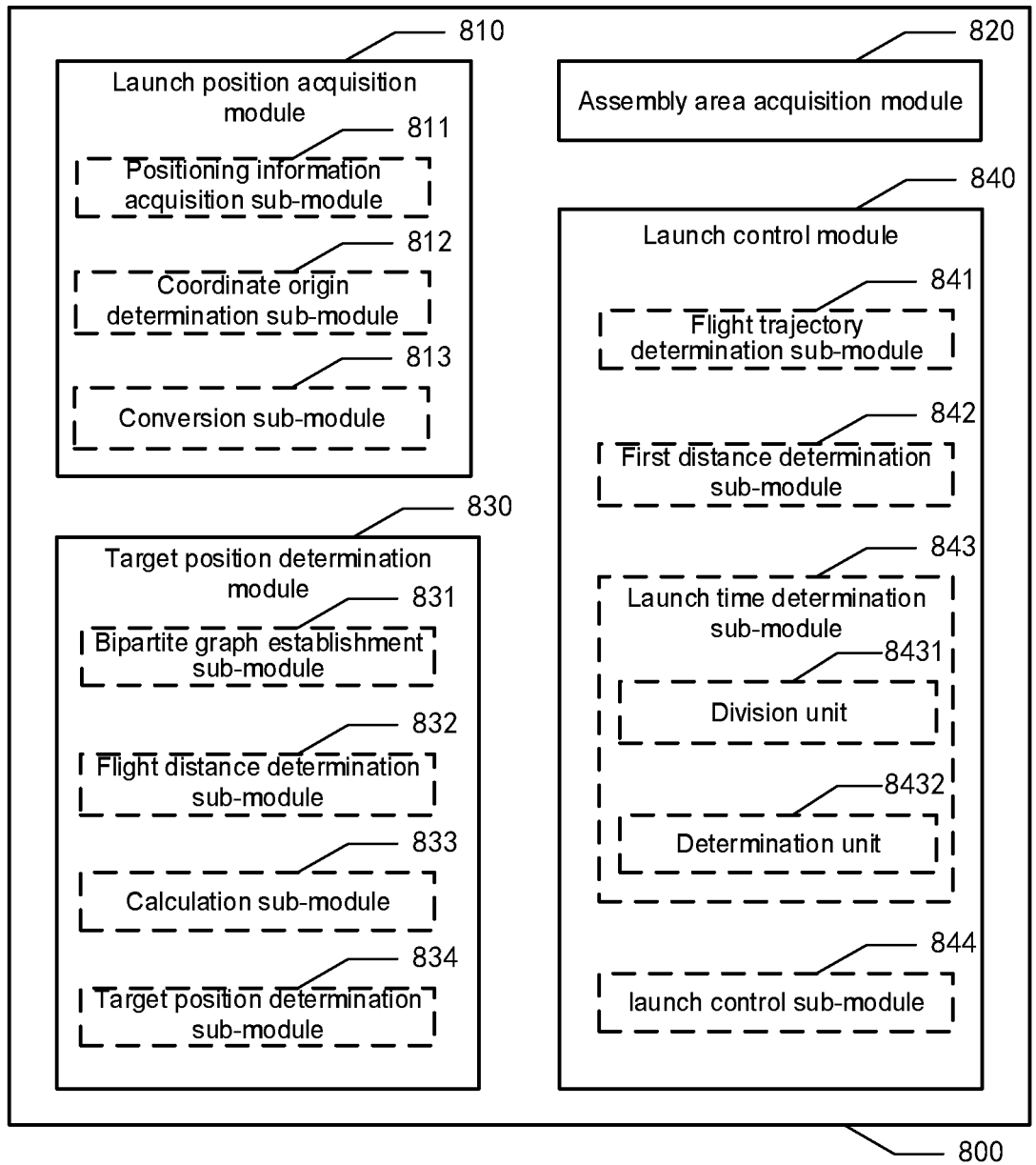
FIG. 8 schematically shows a structural block diagram of an apparatus of launching an unmanned aerial vehicle cluster according to the embodiments of the present disclosure.

FIG. 8 schematically shows a structural block diagram of an apparatus of launching an unmanned aerial vehicle cluster according to the embodiments of the present disclosure.

As shown in FIG. 8, an apparatus 800 of launching an unmanned aerial vehicle cluster in the embodiments of the present disclosure includes a launch position acquisition module 810, an assembly area acquisition module 820, a target position determination module 830, and a launch control module 840. The unmanned aerial vehicle cluster may include a plurality of unmanned aerial vehicles located in the launch area, for example, unmanned aerial vehicles 101 to 105 located in the launch area 10 shown in FIG. 1.

The launch position acquisition module 810 is used to acquire the launch positions for the plurality of unmanned aerial vehicles in the launch area. According to the embodiments of the present disclosure, the launch position acquisition module 810 may acquire the launch positions, for example, through position sensors provided in the unmanned aerial vehicles 101 to 105. The launch position acquisition module 810 may be used to, for example, perform operation S210 described with reference to FIG. 2, which will not be repeated here.

The assembly area acquisition module 820 is used to acquire the assembly area corresponding to the launch area, and the assembly area includes a plurality of target positions. According to the embodiments of the present disclosure, the assembly area acquisition module 820 may acquire the assembly area, for example, through communication with a server or a cloud system, and the assembly area may correspond to the launch area one by one. The assembly area acquisition module 820 may be used to, for example, perform operation S220 described with reference to FIG. 2, which will not be repeated here.

The target position determination module 830 is used to determine the target position for each unmanned aerial vehicle of the plurality of unmanned aerial vehicles according to the launch positions for the plurality of unmanned aerial vehicles and the plurality of target positions. According to the embodiments of the present disclosure, the target position determination module 830 may be, for example, pre-stored program instructions that may determine the target positions when executed by a processor. The target position acquisition module 830 may be used to, for example, perform operation S230 described with reference to FIG. 2, which will not be repeated here.

The launch control module 840 is used to control the launch of the plurality of unmanned aerial vehicles according to the launch position for each unmanned aerial vehicle of the plurality of unmanned aerial vehicles and the target position for each unmanned aerial vehicle. According to the embodiments of the present disclosure, the launch control module 840 may control the launch of the plurality of unmanned aerial vehicles, for example, through communication with the plurality of unmanned aerial vehicles. The launch control module 840 may be used to, for example, perform operation S240 described with reference to FIG. 2, which will not be repeated here.

According to the embodiments of the present disclosure, as shown in FIG. 8, the launch position acquisition module 810 may include, for example, a positioning information acquisition sub-module 811, a coordinate origin determination sub-module 812 and a conversion sub-module 813. The positioning information acquisition sub-module 811 is used to acquire the positioning information of the plurality of unmanned aerial vehicles in the launch area. The positioning information acquisition sub-module 811 may be implemented as, for example, a position sensor of each unmanned aerial vehicle of the plurality of unmanned aerial vehicles. The coordinate origin determination sub-module 812 is used to determine the coordinate origin in the launch area. The conversion sub-module 813 is used to convert the positioning information of the plurality of unmanned aerial vehicles in the launch area into the relative position information with respect to the coordinate origin according to the conversion rule. The relative position information may indicate the launch position for the plurality of unmanned aerial vehicles in the launch area. According to the embodiments of the present disclosure, the coordinate origin determination sub-module 812 and the conversion sub-module 813 may be implemented as two different program instructions or the same program instruction that may achieve the functions described above when executed by the processor. The positioning information acquisition sub-module 811, the coordinate origin determination sub-module 812 and the conversion sub-module 813 may be used, for example, to perform operation S311 to operation S313 described with reference to FIG. 3, respectively, which will not be repeated here.

According to the embodiments of the present disclosure, as shown in FIG. 8, the target position determination module 830 may include, for example, a bipartite graph establishment sub-module 831, a flight distance determination sub-module 832, a calculation sub-module 833 and a target position determination sub-module 834. The bipartite graph establishment sub-module 831 is used to establish a bipartite graph according to the launch positions for the plurality of unmanned aerial vehicles and the plurality of target positions. The flight distance determination sub-module 832 is used to determine the flight distance of each unmanned aerial vehicle with respect to the plurality of target positions according to the launch positions for the plurality of unmanned aerial vehicles and the plurality of target positions. The calculation sub-module 833 is used to perform a maximum weight matching calculation on the bipartite graph according to the flight distance of each unmanned aerial vehicle with respect to the plurality of target positions, so as to obtain a calculation result. The target position determination sub-module 834 is used to determine the target position for each unmanned aerial vehicle according to the calculation result. The calculation result is obtained to minimize the sum of the flight distance of each unmanned aerial vehicle of the plurality of unmanned aerial vehicles with respect to the determined target position. According to the embodiments of the present disclosure, the bipartite graph establishment sub-module 831, the flight distance determination sub-module 832, the calculation sub-module 833 and the target position determination sub-module 834 may be implemented as, for example, program instructions that may achieve the above functions when invoked by the processor. The bipartite graph establishment sub-module 831, the flight distance determination sub-module 832, the calculation sub-module 833 and the target position determination sub-module 834 may be used, for example, to perform operation S431 to operation S434 described with reference to FIG. 4, respectively, which will not be repeated here.

According to the embodiments of the present disclosure, as shown in FIG. 8, the launch control module 840 may include, for example, a flight path determination sub-module 841, a first distance determination sub-module 842, a launch time determination sub-module 843 and a launch control sub-module 844. The flight path determination sub-module 841 is used to determine the flight path of each unmanned aerial vehicle according to the launch position for each unmanned aerial vehicle and the target position for each unmanned aerial vehicle. The first distance determination sub-module 842 is used to determine the first distance between any two unmanned aerial vehicles of the plurality of unmanned aerial vehicles according to the flight paths of the any two unmanned aerial vehicles. The launch time determination sub-module 843 is used to determine the launch time of each unmanned aerial vehicle according to the first distance between any two unmanned aerial vehicles. The launch control sub-module 844 is used to control the launch of each unmanned aerial vehicle according to the launch time of each unmanned aerial vehicle and the flight path of each unmanned aerial vehicle. The first distance between any two unmanned aerial vehicles is the shortest distance between the flight paths of the any two unmanned aerial vehicles. According to the embodiments of the present disclosure, the flight path determination sub-module 841, the first distance determination sub-module 842 and the launch time determination sub-module 843 may be implemented as program instructions, and the launch control sub-module 844 may be implemented as, for example, program instructions and a communication module in communication with the plurality of unmanned aerial vehicles, so as to control the launch of the plurality of unmanned aerial vehicles through communication with the plurality of unmanned aerial vehicles. The flight path determination sub-module 841, the first distance determination sub-module 842, the launch time determination sub-module 843 and the launch control sub-module 844 may be used, for example, to perform operation S541 to operation S544 described with reference to FIG. 5, respectively, which will not be repeated here.

According to the embodiments of the present disclosure, as shown in FIG. 8, the launch time determination sub-module 843 may include a division unit 8431 and a determination unit 8432. The division unit 8431 is used to divide the plurality of unmanned aerial vehicles into N flight groups according to the first distance between any two unmanned aerial vehicles, where N is an integer greater than 1. The determination unit 8432 is used to determine the launch time of each flight group of the N flight groups. Each flight group includes at least one unmanned aerial vehicle, and the first distance between any two unmanned aerial vehicles of the plurality of unmanned aerial vehicles in any flight group of the N flight groups is not less than the preset distance in a case that the any flight group includes the plurality of unmanned aerial vehicles. Different flight groups have different launch times, and the at least one unmanned aerial vehicle included in each flight group has the same launch time. According to the embodiments of the present disclosure, the division unit 8431 and the determination unit 8432 may be implemented as program instructions. For example, the division unit 8431 and the determination unit 8432 may be used, for example, to perform operation S6431 to operation S6432 described with reference to FIG. 6A, respectively, which will not be repeated here.

According to the embodiments of the present disclosure, the division unit 8431 may be specifically used to cyclically perform the following operations: determining the number of the unmanned aerial vehicles included in the i-th flight group; determining whether the first distance between any two unmanned aerial vehicles in the i-th flight group is less than the preset distance or not, in response to determining that the number of unmanned aerial vehicles included in the i-th flight group is greater than 1; allocating one of two unmanned aerial vehicles in the i-th flight group into the i+1-th flight group in response to determining that the first distance between the two unmanned aerial vehicles is less than the preset distance; and setting i to i+1 in response to determining that the first distance between every two unmanned aerial vehicles in the i-th flight group is not less than the preset distance. The plurality of unmanned aerial vehicles belong to the first flight group before cyclically performing the operations, $1 \leq i \leq N$. According to the embodiments of the present disclosure, the division unit 8431 may be specifically used, for example, to perform operations S6431A to S6431E described with reference to FIG. 6B, respectively, which will not be repeated here.

Any number of the modules, sub-modules, units and sub-units according to the embodiments of the present disclosure, or at least part of the functions of any number of them may be implemented in one module. Any one or more of the modules, sub-modules, units and sub-units according to the embodiments of the present disclosure may be split into multiple modules for implementation. Any one or more of the modules, sub-modules, units and sub-units according to the embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub-modules, units and sub-units according to the embodiments of the present disclosure may be at least partially implemented as a computer program module that, when executed, performs the corresponding functions.

For example, any number of the launch position acquisition module 810, the assembly area acquisition module 820, the target position determination module 830, the launch control module 840, the positioning information acquisition sub-module 811, the coordinate origin determination sub-module 812, the conversion sub-module 813, the bipartite graph establishment sub-module 831, the flight distance determination sub-module 832, the calculation sub-module 833, the target position determination sub-module 834, the flight path determination sub-module 841, the first distance determination sub-module 842, the launch time determination sub-module 843, the launch control sub-module 844, the division unit 8431 and the determining unit 8432 may be combined into one module for implementation, or any one of the modules may be divided into multiple modules. Alternatively, at least part of the functions of one or more of these modules may be combined with at least part of the functions of other modules and implemented in one module. According to the embodiments of the present disclosure, at least one of the launch position acquisition module 810, the assembly area acquisition module 820, the target position determination module 830, the launch control module 840, the positioning information acquisition sub-module 811, the coordinate origin determination sub-module 812, the conversion sub-module 813, the bipartite graph establishment sub-module 831, the flight distance determination sub-module 832, the calculation sub-module 833, the target position determination sub-module 834, the flight path determination sub-module 841, the first distance determination sub-module 842, the launch time determination sub-module 843, the launch control sub-module 844, the division unit 8431 and the determining unit 8432 may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the launch position acquisition module 810, the assembly area acquisition module 820, the target position determination module 830, the launch control module 840, the positioning information acquisition sub-module 811, the coordinate origin determination sub-module 812, the conversion sub-module 813, the bipartite graph establishment sub-module 831, the flight distance determination sub-module 832, the calculation sub-module 833, the target position determination sub-module 834, the flight path determination sub-module 841, the first distance determination sub-module 842, the launch time determination sub-module 843, the launch control sub-module 844, the division unit 8431 and the determining unit 8432 may be at least partially implemented as a computer program module that may perform corresponding functions when executed.

Figure 9:
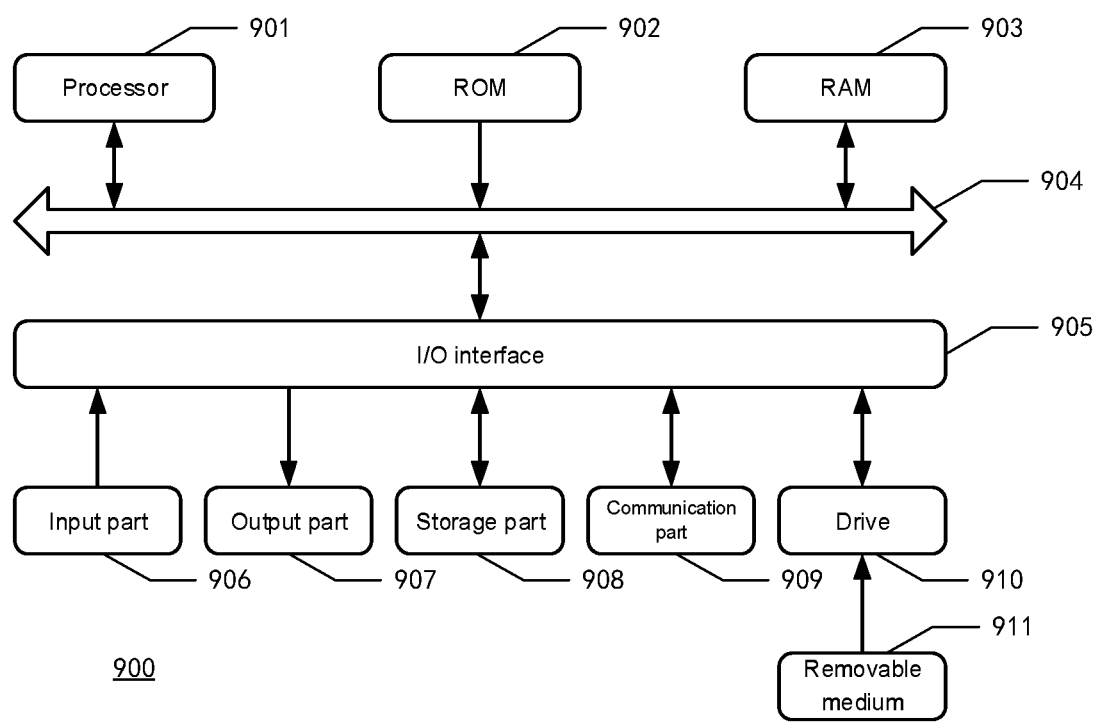
FIG. 9 schematically shows a block diagram of a launch control system for implementing the method of launching the unmanned aerial vehicle cluster according to the embodiments of the present disclosure.

FIG. 9 schematically shows a block diagram of a launch control system for implementing the method of launching the unmanned aerial vehicle cluster according to the embodiments of the present disclosure. The launch control system shown in FIG. 9 is merely an example, and should not bring any limitation to the function and scope of use of the embodiments of the present disclosure.

As shown in FIG. 9, a launch control system 900 according to the embodiments of the present disclosure includes a processor 901, which may execute various appropriate actions and processing according to the program stored in a read only memory (ROM) 902 or the program loaded into a random access memory (RAM) 903 from a storage part 908. The processor 901 may, for example, include a general-purpose microprocessor (for example, CPU), an instruction set processor and/or a related chipset and/or a special-purpose microprocessor (for example, an application specific integrated circuit (ASIC)), and the like. The processor 901 may further include an on-board memory for caching purposes. The processor 901 may include a single processing unit or multiple processing units for executing different actions of the method flow according to the embodiments of the present disclosure.

Various programs and data required for the operation of the launch control system 900 are stored in the RAM 903. The processor 901, the ROM 902 and the RAM 903 are connected to each other through a bus 904. The processor 901 executes various operations of the method flow according to the embodiments of the present disclosure by executing the programs in the ROM 902 and/or the RAM 903. It should be noted that the program may also be stored in one or more memories other than the ROM 902 and the RAM 903. The processor 901 may also execute various operations of the method flow according to the embodiments of the present disclosure by executing the programs stored in the one or more memories.

According to the embodiments of the present disclosure, the launch control system 900 may further include an input/output (I/O) interface 905 which is also connected to the bus 904. The launch control system 900 may further include one or more of the following components connected to the I/O interface 905: an input part 906 including a keyboard, a mouse, etc.; an output part 907 including a cathode ray tube (CRT), a liquid crystal display (LCD), etc. and a speaker, etc.; a storage part 908 including a hard disk, etc.; and a communication part 909 including a network interface card such as a LAN card, a modem, and the like. The communication part 909 performs communication processing via a network such as the Internet. A drive 910 is also connected to the I/O interface 905 as required. A removable medium 911, such as a magnetic disk, an optical disk, a magneto-optical disk, a semiconductor memory, and the like, is installed on the drive 910 as required, so that the computer program read therefrom is installed into the storage part 908 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication part 909, and/or installed from the removable medium 911. When the computer program is executed by the processor 901, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure further provides a computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to the embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device. For example, according to the embodiments of the present disclosure, the computer-readable storage medium may include the above-mentioned ROM 902 and/or RAM 903 and/or one or more memories other than the ROM 902 and RAM 903.

Figure 10A:
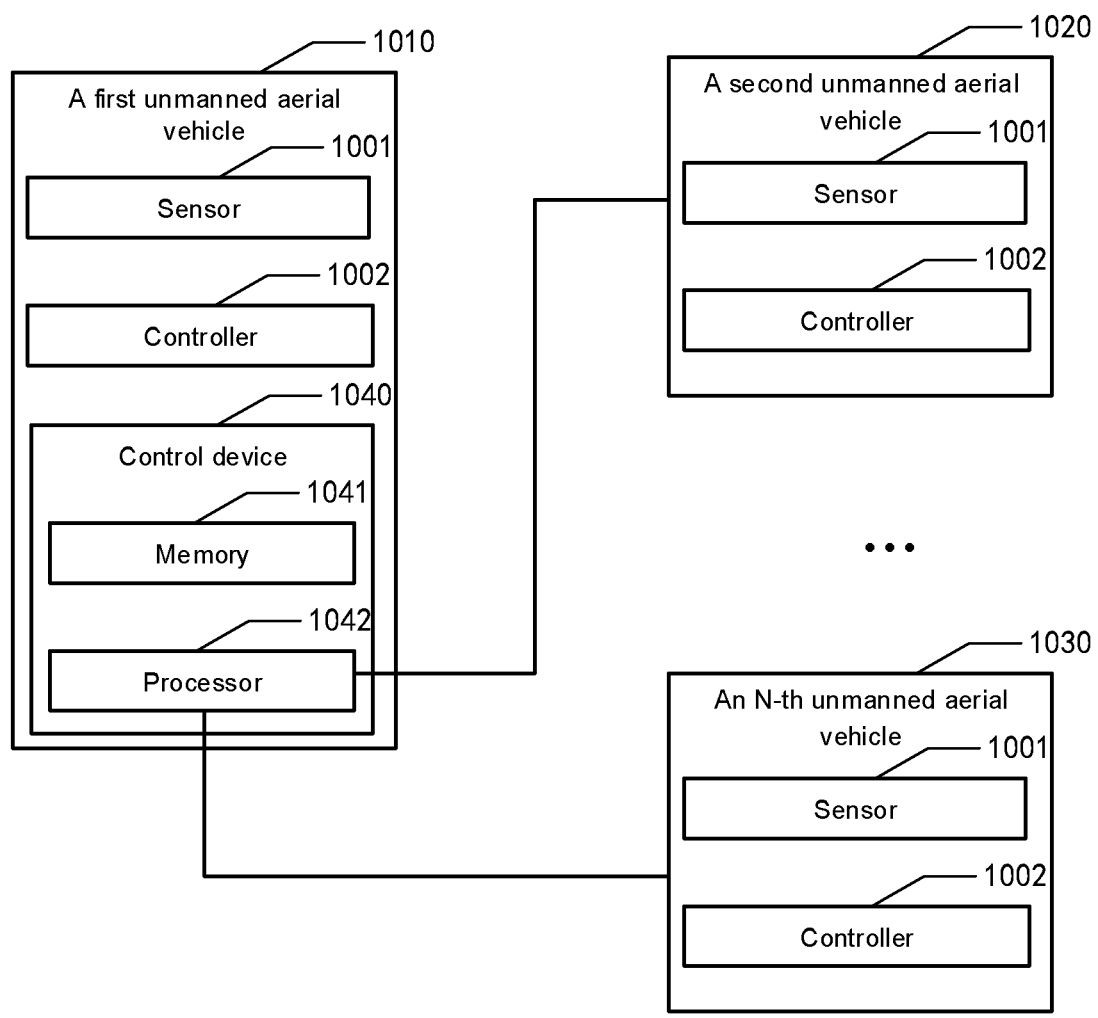
FIG. 10A schematically shows a schematic diagram of an unmanned aerial vehicle cluster system according to an exemplary embodiment of the present disclosure.
Figure 10B:
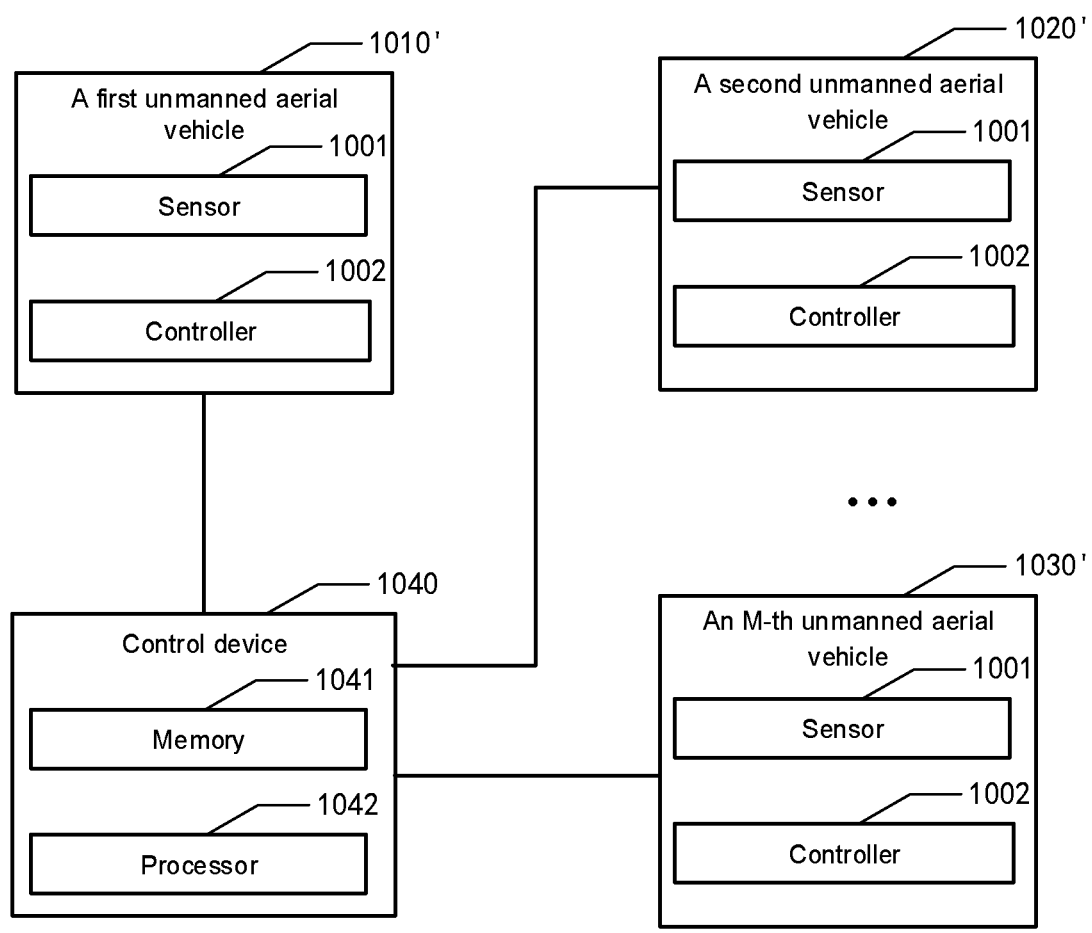
FIG. 10B schematically shows a schematic diagram of an unmanned aerial vehicle cluster system according to another exemplary embodiment of the present disclosure.

FIG. 10A schematically shows a schematic diagram of an unmanned aerial vehicle cluster system according to an exemplary embodiment of the present disclosure. FIG. 10B schematically shows a schematic diagram of an unmanned aerial vehicle cluster system according to another exemplary embodiment of the present disclosure.

As shown in FIG. 10A to FIG. 10B, the unmanned aerial vehicle cluster system of the embodiments of the present disclosure may include a plurality of unmanned aerial vehicles and a control device. The number of the plurality of unmanned aerial vehicles may be set according to practical needs. In an embodiment, the plurality of unmanned aerial vehicles may include, for example, a total of M unmanned aerial vehicles including a first unmanned aerial vehicle to an M-th unmanned aerial vehicle.

In an embodiment, as shown in FIG. 10A, the control device 1040 may be provided in any of the N unmanned aerial vehicles, such as the first unmanned aerial vehicle 1010. In this case, the second unmanned aerial vehicle 1020 to the M-th unmanned aerial vehicle 1030 are communicatively connected to the first unmanned aerial vehicle 1010 to receive a flight signal transmitted by the control device 1040 through the communicative connection.

In an embodiment, as shown in FIG. 10B, the control device 1040 may be provided at a ground control center independently of the first unmanned aerial vehicle to the N-th unmanned aerial vehicle. In this case, the first unmanned aerial vehicle 1010', the second unmanned aerial vehicle 1020' to the M-th unmanned aerial vehicle 1030' are all communicatively connected to the control device 1040 arranged at the ground control center so as to receive the flight signal transmitted by the control device 1040 through the communicative connection.

According to the embodiments of the present disclosure, the control device 1040 may include, for example, a memory 1041 and a processor 1042. The memory 1041 may store one or more program instructions. The processor 1042 may invoke the one or more program instructions to perform the following operations: determining the launch positions for the plurality of unmanned aerial vehicles in the launch area according to the positioning information of the plurality of unmanned aerial vehicles; acquiring the assembly area corresponding to the launch area, wherein the assembly area includes a plurality of target positions (operation S220); determining the target position for each unmanned aerial vehicle of the plurality of unmanned aerial vehicles according to the launch positions for the plurality of unmanned aerial vehicles and the plurality of target positions; and transmitting the flight signal to the controller of each unmanned aerial vehicle according to the launch position for each unmanned aerial vehicle and the target position for each unmanned aerial vehicle. The flight signal is transmitted to control the flight of each unmanned aerial vehicle.

According to the embodiments of the present disclosure, as shown in FIG. 10A to FIG. 10B, each unmanned aerial vehicle of the plurality of unmanned aerial vehicles includes a sensor 1001 and a controller 1002. The sensor 1001 may be, for example, a position sensor or a global positioning system (GPS) used to acquire the positioning information of the unmanned aerial vehicle where the sensor 1001 is located. The controller 1002 may be, for example, a flight control system, a microprocessor, etc., used to control, according to the flight signal, the flight of the unmanned aerial vehicle where the controller 1002 is located. The sensor 1001 may be, for example, connected to the processor 1042 in the control device 1040, so as to transmit the acquired positioning information of the unmanned aerial vehicle to the processor 1042. The controller 1002 may be, for example, connected to the processor 1042 in the control device 1040, so as to receive the flight signal transmitted by the control device 1040 and control, according to the flight signal, the flight of the unmanned aerial vehicle where the controller 1002 is located.

According to the embodiments of the present disclosure, the processor 1042 may transmit the flight signal, for example, by following operations: determining the flight path of each unmanned aerial vehicle according to the launch position for each unmanned aerial vehicle and the target position for each unmanned aerial vehicle (operation S541); determining the first distance between any two unmanned aerial vehicles of the plurality of unmanned aerial vehicles according to the flight paths of the two unmanned aerial vehicles (operation S542); determining the launch time of each unmanned aerial vehicle according to the first distance between the any two unmanned aerial vehicles (operation S543); and transmitting the flight signal to each unmanned aerial vehicle according to the launch time of each unmanned aerial vehicle and the flight path of each unmanned aerial vehicle. The first distance between any two unmanned aerial vehicles is the shortest distance between the flight paths of the any two unmanned aerial vehicles. The flight signal includes the launch time and the flight path.

According to the embodiments of the present disclosure, the processor 1042 may determine the launch time of each unmanned aerial vehicle, for example, by following operations: dividing the plurality of unmanned aerial vehicles into N flight groups according to the first distance between any two unmanned aerial vehicles, where N is an integer greater than 1 (operation S6431); and determining the launch time of each flight group of the N flight groups (operation S6432). Each flight group includes at least one unmanned aerial vehicle, and in a case that any flight group of the N flight groups includes a plurality of unmanned aerial vehicles, the first distance between any two unmanned aerial vehicles of the plurality of unmanned aerial vehicles in the any flight group is not less than the preset distance. Different flight groups have different launch times, and the at least one unmanned aerial vehicle included in each flight group has the same launch time.

According to the embodiments of the present disclosure, the processor 1042 may divide the plurality of unmanned aerial vehicles into N flight groups, for example, by cyclically performing the following operations: determining the number of unmanned aerial vehicles included in the i-th flight group (operation S6431A); determining whether the first distance between any two unmanned aerial vehicles in the i-th flight group is less than the preset distance or not, in response to determining that the number of unmanned aerial vehicles included in the i-th flight group is greater than 1 (operation S6431C); allocating one of the two unmanned aerial vehicles in the i-th flight group into the i+1-th flight group in response to determining that the first distance between the two unmanned aerial vehicles is less than the preset distance (operation S6431D); and setting i to i+1 in response to determining that the first distance between every two unmanned aerial vehicles in the i-th flight group is not less than the preset distance (operation S6431E). The plurality of unmanned aerial vehicles belong to the first flight group before cyclically performing the above operations, $1 \le i \le N$.

According to the embodiments of the present disclosure, the processor 1042 may determine the target position for each unmanned aerial vehicle of the plurality of unmanned aerial vehicles, for example, by performing following operations: establishing a bipartite graph according to the launch position for the plurality of unmanned aerial vehicles and the plurality of target positions (operation S431); determining the flight distance of each unmanned aerial vehicle with respect to the plurality of target positions according to the launch positions for the plurality of unmanned aerial vehicles and the plurality of target positions (operation S432); performing a maximum weight matching calculation on the bipartite graph according to the flight distance of each unmanned aerial vehicle with respect to the plurality of target positions, so as to obtain a calculation result (operation S433); and determining the target position for each unmanned aerial vehicle according to the calculation result (operation S434). The calculation result is obtained to minimize the sum of the flight distance of each unmanned aerial vehicle of the plurality of unmanned aerial vehicles with respect to the determined target position.

According to the embodiments of the present disclosure, the processor 1042 may determine the launch position for the plurality of unmanned aerial vehicles in the launch area, for example, by performing following operations: determining the coordinate origin in the launch area (operation S312); and converting the positioning information of the plurality of unmanned aerial vehicles into the relative position information with respect to the coordinate origin according to the conversion rule, wherein the relative position information indicates the launch positions for the plurality of unmanned aerial vehicles in the launch area (operation S313).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, program segment, or code, which part includes one or more executable instructions for implementing the specified logical function. It should also be noted that, in some alternative implementations, the functions noted in the blocks may also occur in a different order than that noted in the accompanying drawings. For example, two blocks shown in succession may actually be executed substantially in parallel, or they may sometimes be executed in the reverse order, depending on the functions involved. It should also be noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments cannot be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of launching an unmanned aerial vehicle cluster comprising a plurality of unmanned aerial vehicles located in a launch area, the method comprising:
   acquiring launch positions for the plurality of unmanned aerial vehicles in the launch area;
   acquiring an assembly area corresponding to the launch area, wherein the assembly area comprises a plurality of target positions;
   determining a target position for each unmanned aerial vehicle of the plurality of unmanned aerial vehicles according to the launch positions for the plurality of unmanned aerial vehicles and the plurality of target positions; and
   launching the plurality of unmanned aerial vehicles according to the launch position for each unmanned aerial vehicle of the plurality of unmanned aerial vehicles and the target position for each unmanned aerial vehicle of the plurality of unmanned aerial vehicles, comprising:
      determining a flight path of each unmanned aerial vehicle of the plurality of unmanned aerial vehicles according to the launch position for each unmanned aerial vehicle of the plurality of unmanned aerial vehicles and the target position for each unmanned aerial vehicle of the plurality of unmanned aerial vehicles;
      determining a shortest distance between the flight paths of every two unmanned aerial vehicles of the plurality of unmanned aerial vehicles, as a first distance;
      determining a launch time of each unmanned aerial vehicle of the plurality of unmanned aerial vehicles according to the first distance; and
      launching each unmanned aerial vehicle of the plurality of unmanned aerial vehicles according to the launch position for each unmanned aerial vehicle of the plurality of unmanned aerial vehicles and the flight path of each unmanned aerial vehicle of the plurality of unmanned aerial vehicles,
   wherein different launch times for the two unmanned aerial vehicles are set in a case that the first distance is less than a preset distance and a same launch time for the two unmanned aerial vehicles is set in a case that the first distance is not less than the preset distance.

2. The method of claim 1, wherein the determining the launch time of each unmanned aerial vehicle of the plurality of unmanned aerial vehicles according to the first distance comprises:

dividing the plurality of unmanned aerial vehicles into N flight groups according to the first distance, where N is an integer greater than 1; and determining a launch time of each flight group of the N flight groups, wherein each flight group comprises at least one unmanned aerial vehicle, and in a case that the any flight group of the N flight groups comprises more than one unmanned aerial vehicles, the first distance is not less than a preset distance; different flight groups have different launch times, and the at least one unmanned aerial vehicle in each flight group has the same launch time.

3. The method of claim 2, wherein the dividing the plurality of unmanned aerial vehicles into N flight groups according to the first distance comprises cyclically performing operations of:

determining a number of unmanned aerial vehicles in an i-th flight group;

determining whether the first distance in the i-th flight group is less than the preset distance or not, in response to determining that the number of unmanned aerial vehicles in the i-th flight group is greater than 1;

allocating one of two unmanned aerial vehicles in the i-th flight group into an i+1-th flight group in response to determining that the first distance is less than the preset distance; and setting i to i+1 in response to determining that the first distance in the i-th flight group is not less than the preset distance, wherein the plurality of unmanned aerial vehicles belong to a first flight group before cyclically performing the operations, 1≤i≤N.

4. The method of claim 1, wherein the acquiring launch positions for the plurality of unmanned aerial vehicles in the launch area comprises:

acquiring positioning information of the plurality of unmanned aerial vehicles in the launch area;

determining a coordinate origin in the launch area; and converting the positioning information of the plurality of unmanned aerial vehicles in the launch area into relative position information with respect to the coordinate origin according to a conversion rule, wherein the relative position information indicates the launch positions for the plurality of unmanned aerial vehicles in the launch area.

5. A system of launching an unmanned aerial vehicle cluster, comprising:

one or more processors;

a storage device for storing one or more programs, wherein the one or more programs, when executed by the one or more processors, cause the one or more processors to perform the method of claim 1.

6. A computer-readable medium having executable instructions stored thereon, wherein the instructions, when executed by a processor, cause the processor to perform the method of claim 1.

7. An unmanned aerial vehicle cluster system, comprising:

a plurality of unmanned aerial vehicles, wherein each unmanned aerial vehicle of the plurality of unmanned aerial vehicles comprises:

a sensor configured to acquire positioning information of the unmanned aerial vehicle in which the sensor is located;

a controller configured to control, according to a flight signal, a flight of the unmanned aerial vehicle in which the controller is located; and a controller device, comprising:

a memory having one or more program instructions stored thereon; and a processor configured to perform, according to the one or more program instructions, operations of:

determining launch positions for the plurality of unmanned aerial vehicles in a launch area according to the positioning information of the plurality of unmanned aerial vehicles;

acquiring an assembly area corresponding to the launch area, wherein the assembly area comprises a plurality of target positions;

determining a target position for each unmanned aerial vehicle of the plurality of unmanned aerial vehicles according to the launch positions for the plurality of unmanned aerial vehicles and the plurality of target positions; and transmitting a flight signal to the controller of each unmanned aerial vehicle of the plurality of unmanned aerial vehicles according to the launch position for each unmanned aerial vehicle of the plurality of unmanned aerial vehicles and the target position for each unmanned aerial vehicle of the plurality of unmanned aerial vehicles;

determining a flight path of each unmanned aerial vehicle of the plurality of unmanned aerial vehicles according to the launch position for each unmanned aerial vehicle of the plurality of unmanned aerial vehicles and the target position for each unmanned aerial vehicle of the plurality of unmanned aerial vehicles;

determining a shortest distance between the flight paths of every two unmanned aerial vehicles of the plurality of unmanned aerial vehicles, as a first distance;

determining a launch time of each unmanned aerial vehicle of the plurality of unmanned aerial vehicles according to the first distance; and transmitting a flight signal to each unmanned aerial vehicle of the plurality of unmanned aerial vehicles according to the launch time of each unmanned aerial vehicle of the plurality of unmanned aerial vehicles and the flight path of each unmanned aerial vehicle of the plurality of unmanned aerial vehicles, wherein different launch times for the two unmanned aerial vehicles are set in a case that the first distance is less than a preset distance and a same launch time for the two unmanned aerial vehicles is set in a case that the first distance is not less than the preset distance.

8. The system of claim 7, wherein the determining a launch time of each unmanned aerial vehicle of the plurality of unmanned aerial vehicles according to the first distance comprises:

dividing the plurality of unmanned aerial vehicles into N flight groups according to the first distance, where N is an integer greater than 1; and determining a launch time of each flight group of the N flight groups, wherein each flight group comprises at least one unmanned aerial vehicle, and in a case that any flight group of the N flight groups comprises more than one unmanned aerial vehicles, the first distance is not less than a preset distance; different flight groups have different launch times, and the at least one unmanned aerial vehicle in each flight group has the same launch time.

9. The system of claim 8, wherein the dividing the plurality of unmanned aerial vehicles into N flight groups according to the first distance comprises cyclically performing operations of:
   determining a number of unmanned aerial vehicles in an i-th flight group;
   determining whether the first distance in the i-th flight group is less than the preset distance or not, in response to determining that the number of unmanned aerial vehicles in the i-th flight group is greater than 1;
   allocating one of two unmanned aerial vehicles in the i-th flight group into an i+1-th flight group in response to determining that the first distance is less than the preset distance; and
   setting i to i+1 in response to determining that the first distance in the i-th flight group is not less than the preset distance,
   wherein the plurality of unmanned aerial vehicles belong to a first flight group before cyclically performing the operations, $1 \leq i \leq N$.

10. The system of claim 7, wherein the determining the launch positions for the plurality of unmanned aerial vehicles in the launch area according to the positioning information of the plurality of unmanned aerial vehicles comprises:
   determining a coordinate origin in the launch area; and
   converting the positioning information of the plurality of unmanned aerial vehicles into relative position information with respect to the coordinate origin according to a conversion rule, wherein the relative position information indicates the launch positions for the plurality of unmanned aerial vehicles in the launch area.

11. The system of claim 7, wherein the control device is provided in any unmanned aerial vehicle of the plurality of unmanned aerial vehicles.

\* \* \* \* \*